US012201989B2

(12) United States Patent
Menezes et al.

(10) Patent No.: US 12,201,989 B2
(45) Date of Patent: Jan. 21, 2025

(54) METHOD OF AND SYSTEM FOR OPERATING A VERTICAL GRINDING MILL

(71) Applicant: Anglo American Minério de Ferro Brasil S/A, Minas Gerais (BR)

(72) Inventors: Kellson Takenaka Menezes, Minas Gerais (BR); Mario Cesar Castro Arruda, Minas Gerais (BR); Marlon Fábio Marques Lino, Minas Gerais (BR); Mauro Alberto Castheloge Rossi, Minas Gerais (BR); Ricardo Oliveira Coutinho, Minas Gerais (BR)

(73) Assignee: ANGLO AMERICAN INVESTIMENTOS-MINÉRIO DE FERRO LTDA, Belo Horizonte (BR)

( * ) Notice: Subject to any disclaimer, the term of this patent is extended or adjusted under 35 U.S.C. 154(b) by 0 days.

(21) Appl. No.: 18/571,818

(22) PCT Filed: Jun. 21, 2022

(86) PCT No.: PCT/IB2022/055743
§ 371 (c)(1),
(2) Date: Dec. 19, 2023

(87) PCT Pub. No.: WO2022/269485
PCT Pub. Date: Dec. 29, 2022

(65) Prior Publication Data

US 2024/0216922 A1 Jul. 4, 2024

(30) Foreign Application Priority Data

Jun. 23, 2021 (GB) ...................................... 2109006

(51) Int. Cl.
*B02C 17/18* (2006.01)
*B02C 17/16* (2006.01)

(52) U.S. Cl.
CPC ........ *B02C 17/1805* (2013.01); *B02C 17/163* (2013.01); *B02C 2210/01* (2013.01)

(58) Field of Classification Search
CPC .............. B02C 17/1805; B02C 17/163; B02C 2210/01; B02C 17/16; B02C 25/00
See application file for complete search history.

(56) References Cited

U.S. PATENT DOCUMENTS

2004/0251331 A1* 12/2004 Archibald ............. B02C 17/183 241/21
2010/0016185 A1* 1/2010 Goto ......................... C23C 8/80 427/457

(Continued)

FOREIGN PATENT DOCUMENTS

CN 111715354 A 9/2020

OTHER PUBLICATIONS

International Preliminary Report on Patentability for Application No. PCT/IB2022/055743, mailed Aug. 8, 2024 (23 pages).

(Continued)

*Primary Examiner* — Mohammad K Islam
(74) *Attorney, Agent, or Firm* — NIXON PEABODY LLP; Jeffrey L. Costellia

(57) ABSTRACT

The invention relates to a method of predicting a level of wear of a wear component of a vertical mill, whereby the vertical mill is used for grinding feed material. The method includes, while the mill is in operation, (i) capturing/obtaining a thermal profile of the mill from outside a grinding chamber of the mill, and (ii) determining an indication as to a level of wear of at least one wear component of the mill which is located inside the grinding chamber, based on the thermal profile of the mill. The step of capturing/obtaining a thermal profile may include performing a thermographic analysis of the mill from outside the grinding chamber of the mill. The determining step may include determining whether (Continued)

the wear component requires changing/replacement based on the thermographic analysis of the mill.

20 Claims, 37 Drawing Sheets

(56) References Cited

U.S. PATENT DOCUMENTS

| | | | |
|---|---|---|---|
| 2011/0073694 | A1 | 3/2011 | Timm et al. |
| 2013/0191943 | A1 | 7/2013 | Apuya |
| 2014/0338474 | A1 | 11/2014 | Sepulveda Villalobos et al. |
| 2015/0017881 | A1 | 1/2015 | Weigmann et al. |
| 2015/0053799 | A1 | 2/2015 | Storm |
| 2015/0322634 | A1 | 11/2015 | Stock et al. |
| 2016/0375442 | A1* | 12/2016 | Kucukyavuz et al. ...................... B02C 15/006 241/47 |
| 2016/0376274 | A1 | 12/2016 | Carra et al. |
| 2019/0368659 | A1* | 12/2019 | Rebernik ............... G01K 1/026 |

OTHER PUBLICATIONS

Longhurst, "Infrared Monitoring Techniques for Real-Time Monitoring of Rotary Ball Mills", Cement Industry Technical Conference Record, 2009, (12 pages).
Combined Search and Examination Report for Application No. GB2109006.3, mailed Mar. 29, 2022 (9 pages).
International Search Report for Application No. PCT/IB2022/055743, mailed Sep. 21, 2022 (2 pages).
Written Opinion for Application No. PCT/IB2022/055743, mailed Sep. 21, 2022 (9 pages).

* cited by examiner

0414- MB-01 - VERTIMILL

| Area 0414 | % of Solids | % of Solids | % of Solids | % of Solids | Current (%) | Current (%) | Current (%) | Current (%) | Filling Level |
|---|---|---|---|---|---|---|---|---|---|
| | 4/13/2019 | 5/12/2019 | 6/10/2019 | 7/12/2019 | 2/13/2019 | 7/12/2019 | 6/10/2019 | 7/12/2019 | 6/21/2019 |
| 0414-MB-01 | 79,21 | 80 | 80 | 79 | 90,47 | 91,58 | 78 | 81 | 85,48 |
| 0414-MB-02 | 80,2 | 79,7 | 79,5 | 80 | 91 | 90,59 | 88 | 88 | 111,16 |
| 0414-MB-03 | 79,55 | 79,8 | 78,7 | 80,5 | 90 | 91 | 91 | 92 | 96,68 |
| 0414-MB-04 | 79,87 | 80,2 | 79 | 80 | 89 | 90 | 88 | 89 | 96,37 |
| 0414-MB-05 | 79,21 | 80 | 78 | 79,5 | 90 | 90 | 77 | 83 | 89,21 |
| 0414-MB-06 | 80..04 | 79,9 | 79,8 | 79,5 | 92 | 88 | 91 | 91 | |
| 0414-MB-07 | 79,71 | - | 80 | 79,5 | 87,5 | 90,59 | 79 | 91 | 92,77 |
| 0414-MB-08 | 79,53 | 80 | 79,5 | 79 | 88,6 | 90,4 | 91 | 90 | 102,44 |

| Area 0416 | % of Solids | % of Solids | % of Solids | % of Solids | Current (%) | Current (%) | Current (%) | Current (%) | Filling Level |
|---|---|---|---|---|---|---|---|---|---|
| | 4/13/2019 | 5/12/2019 | 6/10/2019 | 7/12/2019 | 2/13/2019 | 7/12/2019 | 6/10/2019 | 7/12/2019 | 6/21/2019 |
| 0416-MB-01 | 79,14 | 80,6 | 80 | 79 | 91 | 92 | 91 | 92 | 125,51 |
| 0416-MB-02 | 80,4 | 80,4 | 80 | 79,5 | 90 | 94 | 90 | 90 | 116,06 |
| 0416-MB-03 | 79,38 | 80,2 | 77 | 80 | 91 | 90 | 91 | 92 | 90,23 |
| 0416-MB-04 | 79,55 | 80,6 | 80 | 80 | 92 | 91 | 92 | 91 | 127,78 |
| 0416-MB-05 | 80,04 | 80,2 | 79 | 79 | 89 | 91 | 89 | 86 | 109,57 |
| 0416-MB-06 | 79,87 | 80,5 | 80 | 79 | 92 | 92 | 92 | 90 | 104,14 |
| 0416-MB-07 | 80,2 | 80,6 | 79 | 79,5 | 91 | 91 | 91 | 89 | 103,12 |
| 0416-MB-08 | 79,71 | 80,2 | 79,5 | 79 | 94 | 0 | 94 | 92 | 98,03 |

Fig. 10

0416-MB-01 07°CICLO 4159 HORIMETRO

0416-MB-02 07°CICLO 3155 HORIMETRO

0416-MB-06 – HOURMETER 5867

| COMPOSITON | THERMOGRAM | LININGS | |
|---|---|---|---|
| (2) END LININGS ZX 11754067 R4<br>(6) WEAR LININGS<br><br><u>FINAL CONDITION OF THE LINING</u><br>THE LINING PRESENTS END OF LIFE CHARACTERISTICS, ACCORDING TO THERMOGRAPHIC ANALYSIS | 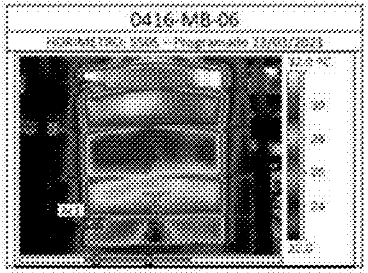  | 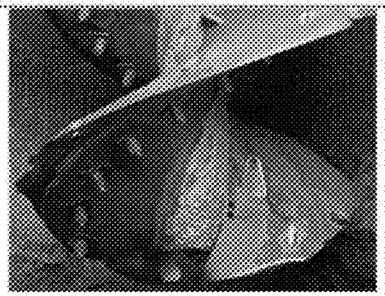 |  |

0414-MB-07 – HOURMETER 5525

| COMPOSITION | THERMOGRAM | LININGS | |
|---|---|---|---|
| (2) END LININGS ZX 11754067 R4<br>(4) WEAR LININGS<br>STAYED (2) WEAR LININGS<br>SCREW WITH 8613 HOURS<br><br><u>FINAL CONDITION OF THE LINING</u><br>THE LINING PRESENTS END OF LIFE CHARACTERISTICS, ACCORDDING TO THERMOGRAPHIC ANALYSIS | 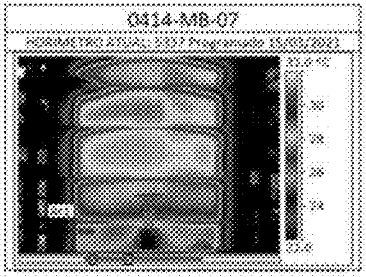  | 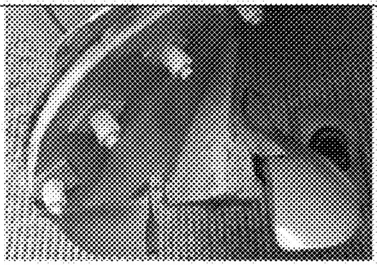 |  |

Fig. 14

NORMAL FEEDING

DISCHARGE: LINING #10 - TEMPERATURE: 35°C - DELTA: 2.3°C - ANTENTION

METHOD OF AND SYSTEM FOR OPERATING A VERTICAL GRINDING MILL

BACKGROUND OF INVENTION

Vertical mills (e.g. Vertimill® 1500HP, manufactured by Metso) is typically applied in a secondary grinding stage (although it can also be applied to a primary grinding stage), and is capable of grinding material with particle sizes in the region of about 6 mm in diameter down to particle sizes in the region of 20 microns in diameter.

A vertical mill typically includes a housing/frame in the form of a grinding chamber. A helical screw may be located inside the housing and rotatable about a vertical axis of rotation. A motor may be drivingly connected to the screw in order to rotate the screw during operation. Grinding bodies, in the form of grinding balls, may be located inside the housing in order to help grind feed material which, in use, is fed into the grinding chamber for the purposes of grinding the material.

Wear components in the form of helical wear linings or wear plates or wear coatings are secured to the screw. A vertical mill typically has two end wear plates/wear coatings/wear linings (hereinafter only referred to as the "wear plates") which are secured to an operatively upper/top portion and operatively lower/bottom portion of the screw, respectively. The vertical mill also includes one or more intermediate wear plates/wear coatings/wear linings. The wear plates are typically secured to the screw by means of bolts and nuts.

These wear plates wear out over time and, as a result, tend to be the biggest maintenance cost for vertical mills. The wear plates typically have an operational average of 3900 hours, with a total of 35 annual changes (assuming there are 16 mills in total).

During operation the feed material inside the housing is ground by the grinding balls through constant friction as a result of the vertical movement of the feed material which is raised by the rotating screw (e.g. a helical propeller) and the wear plates which are installed inside the housing (i.e. thereby generating wear through abrasion). Feeding is performed from the bottom of the housing and a resulting product (of ground material) is overflowed at a top of the housing.

Vertical mills however have a major drawback compared to other types of mills, which is their monitoring. Currently, carrying out inspections on vertical mills is only possible by opening and completely emptying them. This takes a large amount of time and significantly increases exposure to the risk of projection and material drop. As a result of this drawback, many companies resist purchasing such equipment and decide to rather use other types of mills, even with lesser performance.

The Inventors wish to address this problem.

PRIOR ART REFERENCES

Reference is made to the following documents:

a) CEMENT INDUSTRY TECHNICAL CONFERENCE RECORDS, 2009, LONGHURST D V ET AL, "Infrared Monitoring Techniques for Real-Time Monitoring of Rotary Ball Mills". This document's focus is specifically on the monitoring the overall efficiency of ball mills using infrared technology. Although the document mentions that it is possible to use the described system to monitor wear on the liners, the document does not actually mention how this could be done. No reference is also made as to how this technology could be adapted in order to allow it to be used for vertical mills.

b) US 2014/0338474 describes a system for sensing an interior of a rotary mineral mill (i.e. not a vertical mill). The system includes sensors which are installed inside a feed hopper via which material is introduced into an interior of the mill.

h. CN 111715354 describes a system for detecting abrasion of a lining plate of a vertical stirring mill. The system includes an industrial camera 5 which is mounted above an observation hole, in order to capture images of inside the mill. No mention is however made as to how thermal images (i.e. not normal images captured by a standard camera) could be used to calculate an indication of wear of wear components inside the mill.

SUMMARY OF INVENTION

In accordance with a first aspect of the invention there is provided a method of predicting a level of wear of a wear component of a vertical mill, whereby the vertical mill is used for grinding feed material, wherein the method includes, while the mill is in operation:

capturing/obtaining a thermal profile of the mill from outside a grinding chamber/housing (hereinafter referred to as "grinding chamber") of the mill; and determining an indication as to a level of wear of at least one wear component of the mill which is located inside the grinding chamber, based on the thermal profile of the mill.

The step of capturing/obtaining a thermal profile may include performing a thermographic analysis of the mill from outside the grinding chamber of the mill.

The step of determining an indication as to a level of wear of at least one wear component of the mill which is located inside the grinding chamber, may be based on the thermographic analysis of the mill.

The thermal Profile may be captured/obtained of the grinding chamber. More specifically, the thermographic analysis is performed on the grinding chamber. Even more specifically, the thermographic analysis is performed on the contents inside the grinding chamber, i.e. the at least one wear component and the feed material located inside the grinding chamber. The contents may include the at least one wear component and the feed material. The contents may also include other component(s) of the mill which is/are located inside the grinding chamber (e.g. a rotating screw).

The determining step may be performed in real-time. The determining step may be performed on a continual/continuous basis while the mill is in operation (i.e. grinding feed material). The performing step may be performed in real-time. The performing step may be performed on a continual/continuous basis while the mill is in operation (i.e. grinding feed material).

The feed material may be slurry, more specifically iron ore slurry.

The determining step may include determining an indication as to a level of wear of a plurality of wear components of the mill which is located inside the grinding chamber, based on the thermographic analysis of the mill.

The determining step may include determining whether the wear component requires changing/replacement based on the thermographic analysis of the mill.

The method may include capturing one or more thermal images of the grinding chamber by using a thermal image capturing device which is located outside the grinding chamber and which is directed towards the grinding chamber. The one or more thermal images may be captured from a lateral side of the grinding chamber. The method may include using the one or more thermal images within the thermographic analysis. As an alternative, one or more temperature sensors could be used in order to capture one or more temperature readings of the grinding chamber. Preferably, a plurality of temperature sensors could be used. The temperature sensors may be located outside the grinding chamber and be directed towards the grinding chamber. The temperature sensors may therefore be spaced from the grinding chamber. The temperature profile may be created/obtained using data from the temperature sensors.

The thermal image capturing device may be spaced from the grinding chamber. More specifically, the thermal image capturing device may be spaced laterally from the grinding chamber (i.e. spaced operatively horizontally from the grinding chamber). The thermal image capturing device may be spaced more than 1 m away from the grinding chamber. Preferably, the thermal image capturing device may be spaced more than 3 m away from the grinding chamber. More preferably, the thermal image capturing device may be spaced more than 5 m away from the grinding chamber. Even more preferably, the thermal image capturing device may be spaced more than 10 m away from the grinding chamber (e.g. 11 m away). Preferably, the thermal image capturing device may be spaced 30 m or less away from the grinding chamber (e.g. between 10 m and 30 m away).

The grinding chamber may have a longitudinal shape. More specifically, the grinding chamber may have a substantially cylindrical outer shape. The thermal image capturing device may be radially spaced from the grinding chamber. The one or more thermal images may be captured from a lateral/radially outer side of the grinding chamber. The thermal camera may be spaced from, and directed towards, a radially/lateral outer side of the grinding chamber.

The at least one wear component may be a wear liner or wear coating of the mill. The at least one wear component may be a coating plate.

The mill may include a rotating screw to which at least one wear liner is secured. The screw may be rotatable about an axis of rotation. The at least one wear liner may be the said at least one wear component. A plurality of wear liners may be secured to the rotating screw. The screw may be a helical screw. The screw may be connected to a motor/drive unit which rotates the screw about its axis of rotation.

The screw may extend along a length of the grinding chamber. The axis of rotation of the screw may be co-axial with a longitudinal axis of the grinding chamber.

The determining step may include identifying whether a dead zone of sedimented material has formed at an operatively lower part/end of the grinding chamber (i.e. inside the grinding chamber), by using the thermal profile or thermographic analysis.

The method may include:

measuring an ambient temperature and using it as a reference temperature within the thermographic analysis;

obtaining, by using a processor, a thermal distribution of the grinding chamber captured within the thermal image(s) thereof; and comparing the thermal distribution with the reference temperature.

The method may include:

measuring an ambient temperature and using it as a reference temperature within the step of determining an indication as to a level of wear of at least one wear component of the mill which is located inside the grinding chamber;

obtaining, by using a processor, a thermal distribution of the grinding chamber by utilising the thermal profile; and comparing the thermal distribution with the reference temperature.

The step of obtaining a thermal distribution of the grinding chamber may more specifically include obtaining a thermal distribution of an operatively lower portion/bottom portion of the grinding chamber.

The method may include:

generating, by using a processor, a histogram of the thermal distribution of the portion and comparing it with the reference temperature;

identifying a temperature within the histogram with the greatest influence/highest occurrence; and estimating when the at least one wear component requires replacement, by utilising the said comparison.

In accordance with a second aspect of the invention there is provided a method of operating a vertical mill which is used for grinding feed material, wherein the method includes:

while the mill is in operation, creating/obtaining a thermal profile of the mill from outside a grinding chamber/housing (hereinafter referred to as "grinding chamber") of the mill; and while the mill is in operation, determining an indication as to a level of wear of a wear component of the mill which is located inside the grinding chamber based on the thermal profile of the mill.

The step of capturing/obtaining a thermal profile may include performing a thermographic analysis of the mill from outside the grinding chamber of the mill.

The step of determining an indication as to a level of wear of at least one wear component of the mill which is located inside the grinding chamber, may be based on the thermographic analysis of the mill.

The thermal profile may be captured/obtained of the grinding chamber. More specifically, the thermographic analysis is performed on the grinding chamber. Even more specifically, the thermographic analysis is performed on the contents inside the grinding chamber, i.e. the at least one wear component and the feed material located inside the grinding chamber. The contents may therefore include the at least one wear component and the feed material. The contents may also include other component(s) of the mill which is/are located inside the grinding chamber (e.g. a rotating screw).

The feed material may be slurry, more specifically iron ore slurry.

The determining step may be performed in real-time. The determining step may be performed on a continual/continuous basis while the mill is in operation (i.e. grinding feed material). The performing step may be performed in real-time. The performing step may be performed on a continual/continuous basis while the mill is in operation (i.e. grinding feed material).

The determining step may include determining an indication as to a level of wear of a plurality of wear components of the mill which is located inside the grinding chamber, based on the thermographic analysis of the mill.

The determining step may include determining whether the wear component requires changing/replacement based on the thermographic analysis of the mill.

The method may include capturing one or more thermal images of the mill by using a thermal image capturing device which is located outside the grinding chamber and which is directed towards the grinding chamber. The one or more thermal images may be captured from a lateral side of the grinding chamber. The method may include using the one or more thermal images within the thermographic analysis. As an alternative, one or more temperature sensors could be used in order to capture one or more temperature readings of the grinding chamber. Preferably, a plurality of temperature sensors could be used. The temperature sensors may be located outside the grinding chamber and be directed towards the grinding chamber. The temperature sensors may therefore be spaced from the grinding chamber. The temperature profile may be created/obtained using data from the temperature sensors.

The thermal image capturing device may be spaced from the grinding chamber. More specifically, the thermal image capturing device may be spaced laterally from the grinding chamber (i.e. spaced operatively horizontally from the grinding chamber). Preferably, the thermal image capturing device may be spaced more than 3 m away from the grinding chamber. More preferably, the thermal image capturing device may be spaced more than 5 m away from the grinding chamber. Even more preferably, the thermal image capturing device may be spaced more than 8 m away from the grinding chamber (e.g. 11 m away).

The grinding chamber may have a longitudinal shape. More specifically, the grinding chamber may have a substantially cylindrical outer shape. The thermal image capturing device may be radially spaced from the grinding chamber. The one or more thermal images may be captured from a lateral/radially outer side of the grinding chamber. The thermal camera may be spaced from, and directed towards, a radially/lateral outer side of the grinding chamber.

The at least one wear component may be a wear liner or wear coating of the mill. The at least one wear component may be a coating plate.

The mill may include a rotating screw to which at least one wear liner is secured. The screw may be rotatable about an axis of rotation. The at least one wear liner may be the said at least one wear component. A plurality of wear liners may be secured to the rotating screw. The screw may be a helical screw. The screw may be connected to a motor/drive unit which rotates the screw about its axis of rotation. The screw may extend along a length of the grinding chamber. The axis of rotation of the screw may be co-axial with a longitudinal axis of the grinding chamber.

The determining step may include identifying whether a dead zone of sedimented material has formed at an operatively lower part/end of the grinding chamber, by using the thermographic analysis.

The method may include:

- measuring an ambient temperature and using it as a reference temperature within the thermographic analysis;
- obtaining, by using a processor, a thermal distribution of the grinding chamber captured within the thermal image(s) thereof; and
- comparing the thermal distribution with the reference temperature.

The method may include:

- measuring an ambient temperature and using it as a reference temperature within the step of determining an indication as to a level of wear of at least one wear component of the mill which is located inside the grinding chamber;
- obtaining, by using a processor, a thermal distribution of the grinding chamber by utilising the thermal profile; and
- comparing the thermal distribution with the reference temperature.

The step of obtaining a thermal distribution of the grinding chamber may more specifically include obtaining a thermal distribution of an operatively lower portion/bottom portion of the grinding chamber.

The method may include:

- generating, by using a processor, a histogram of the thermal distribution of the portion;
- identifying a temperature within the histogram with the greatest influence/highest occurrence and comparing it with the reference temperature; and
- estimating when the at least one wear component requires replacement, by utilising the said comparison.

The method may include identifying a possible blockage inside the grinding chamber, by utilising the temperature profile or the thermographic analysis.

In accordance with a third aspect of the invention there is provided a system for grinding feed material, wherein the system includes:

- a vertical mill which is used for grinding feed material, and wherein the vertical mill includes
  - a grinding chamber/housing (hereinafter referred to as "grinding chamber") inside which feed material is contained during operation for grinding the feed material, and
  - one or more wear components which is/are located inside the grinding chamber;
- a temperature capturing device/arrangement which is located outside the grinding chamber and directed towards the grinding chamber, wherein the temperature capturing device/arrangement is configured to capture one or more temperature indications/readings of at least part of the grinding chamber during operation
- a processing module which is configured to
  - obtain a thermal profile of the grinding chamber in real-time while the mill is in operation, by using the captured temperature indications/readings, and
  - determine, in real-time, an indication as to a level of wear of the one or more wear components inside the grinding chamber, based on the thermal profile.

A "module", in the context of the specification, includes an identifiable portion of code, computational or executable instructions, or a computational object to achieve a particular function, operation, processing, or procedure. A module may be implemented in software, hardware or a combination of software and hardware. Furthermore, modules need not necessarily be consolidated into one device.

The feed material may be slurry, more specifically iron ore slurry.

The temperature capturing device/arrangement may be a thermal image capturing device. The thermal image capturing device may be configured to capture one or more thermal images of at least part of the grinding chamber during operation.

The processing module may be configured to:

perform a thermographic analysis of the grinding chamber in real-time while the mill is in operation, by using the captured one or more thermal images, and determine, in real-time, an indication as to a level of wear of the one or more wear components inside the grinding chamber, based on the thermographic analysis.

The temperature capturing device/arrangement (e.g. thermal image capturing device) may be spaced from the grinding chamber. More specifically, the temperature capturing device/arrangement may be spaced laterally from the grinding chamber (i.e. spaced operatively horizontally from the grinding chamber). Preferably, the temperature capturing device/arrangement may be spaced more than 3 m away from the grinding chamber. More preferably, the temperature capturing device/arrangement may be spaced more than 5 m away from the grinding chamber. Even more preferably, the temperature capturing device/arrangement may be spaced more than 8 m away from the grinding chamber (e.g. 11 m away).

The grinding chamber may have a longitudinal shape. More specifically, the grinding chamber may have a substantially cylindrical outer shape. The temperature capturing device/arrangement may be radially spaced from the grinding chamber. The one or more thermal images may be captured from a lateral/radially outer side of the grinding chamber. The temperature capturing device/arrangement may be spaced from, and directed towards, a radially/lateral outer side of the grinding chamber.

The temperature capturing device/arrangement may capture the one or more thermal images from a lateral side of the grinding chamber.

The system may include a plurality of wear components which are located inside the grinding chamber. The system may include grinding bodies (e.g. grinding balls) which are located inside the grinding chamber for grinding the feed material during operation.

The plurality of wear components may include one or more wear liners/wear coatings of the mill.

The mill may include a rotating screw which is located inside the grinding chamber. The screw may be rotatable about an axis of rotation. At least some of the plurality of wear components may be secured to the screw. The screw may be a helical screw. The screw may be connected to a motor/drive unit which rotates the screw about its axis of rotation. The screw may extend along a length of the grinding chamber. The axis of rotation of the screw may be co-axial with a longitudinal axis of the grinding chamber.

The processing module may be configured to predict/identify whether a dead zone of sedimented material has formed inside the grinding chamber, at an operatively lower part/end of the grinding chamber, by using the thermographic analysis.

In accordance with a fourth aspect of the invention there is provided a method of predicting a level of wear of a wear component of a mill, whereby the mill is used for grinding feed material, wherein the method includes, while the mill is in operation:

capturing/obtaining a thermal profile of the mill from outside a grinding chamber/housing (hereinafter referred to as "grinding chamber") of the mill; and determining an indication as to a level of wear of at least one wear component of the mill which is located inside the grinding chamber, based on the thermal profile of the mill.

The step of capturing/obtaining a thermal profile may include performing a thermographic analysis of the mill from outside the grinding chamber of the mill.

The step of determining an indication as to a level of wear of at least one wear component of the mill which is located inside the grinding chamber, may be based on the thermographic analysis of the mill.

Any one or more of the features or method steps described in relation to the first aspect of the invention may also apply to the method in accordance with the fourth aspect of the invention, except that the methodology in accordance with a fourth aspect of the invention can also apply to other types of mills (i.e. other than vertical mills, such as ball mills).

The mill may therefore be a ball mill.

In accordance with a fifth aspect of the invention there is provided a method of operating a mill which is used for grinding feed material, wherein the method includes:

while the mill is in operation, capturing/obtaining a thermal profile of the mill from outside a grinding chamber/housing (hereinafter referred to as "grinding chamber") of the mill; and while the mill is in operation, determining an indication as to a level of wear of a wear component of the mill which is located inside the grinding chamber based on the thermographic analysis of the mill.

Any one or more of the features or method steps described in relation to the second aspect of the invention may also apply to the method in accordance with the fifth aspect of the invention, except that the methodology in accordance with a fifth aspect of the invention can also apply to other types of mills (i.e. other than vertical mills, such as ball mills).

The mill may therefore be a ball mill.

In accordance with a sixth aspect of the invention there is provided a system for grinding feed material, wherein the system includes:

a mill which is used for grinding feed material, and wherein the mill includes a grinding chamber/housing (hereinafter referred to as "grinding chamber") inside which feed material is contained during operation for grinding the feed material, and one or more wear components which is/are located inside the grinding chamber;

a temperature capturing device/arrangement which is located outside the grinding chamber and directed towards the grinding chamber, wherein the temperature capturing device/arrangement is configured to capture one or more temperature indications/readings of at least part of the grinding chamber during operation a processing module which is configured to obtain a thermal profile of the grinding chamber in real-time while the mill is in operation, by using the captured temperature indications/readings, and determine, in real-time, an indication as to a level of wear of the one or more wear components inside the grinding chamber, based on the thermal profile.

Any one or more of the features or integers described in relation to the third aspect of the invention may also apply to the system in accordance with the sixth aspect of the invention, except that the system in accordance with a sixth aspect of the invention can also apply to other types of mills (i.e. other than vertical mills, such as ball mills).

The mill may therefore be a ball mill.

In accordance with a seventh aspect of the invention there is provided a system for grinding feed material, wherein the system includes:

- a vertical mill which is used for grinding feed material, and wherein the vertical mill includes
  - a grinding chamber/housing (hereinafter referred to as "grinding chamber") inside which feed material is contained during operation for grinding the feed material, and
  - one or more wear components which is/are located inside the grinding chamber; and
- a temperature capturing device/arrangement which is located outside the grinding chamber and directed towards the grinding chamber, wherein the temperature capturing device/arrangement is configured to capture one or more temperature indications/readings of at least part of the grinding chamber during operation Any one or more of the features or integers described in relation to the third aspect of the invention may also apply to the system in accordance with the seventh aspect of the invention.

A helical screw may therefore be located inside the housing and rotatable about a vertical axis of rotation. A motor may be drivingly connected to the screw in order to rotate the screw during operation. Grinding bodies, in the form of grinding balls, may be located inside the housing in order to help grind feed material which, in use, is fed into the grinding chamber for the purposes of grinding the material.

The grinding chamber may have a longitudinal shape. More specifically, the grinding chamber may have a substantially cylindrical outer shape. The thermal image capturing device may be radially spaced from the grinding chamber. The one or more thermal images may be captured from a lateral/radially outer side of the grinding chamber. The thermal camera may be spaced from, and directed towards, a radially/lateral outer side of the grinding chamber.

DESCRIPTION OF THE DRAWINGS

The invention will now be described, by way of example, with reference to the accompanying diagrammatic drawings. In the drawings:

FIG. 6*b* shows a photo of wear plates which have reached their end-of-life;

FIG. 10 shows a table which presents the operational data required to proceed with the analysis, that include solid percentage and current percentage;

FIG. 14 shows two thermograms of a particular vertical mill and photos of the actual wear plates which correspond to the two thermograms, respectively;

DETAILED DESCRIPTION OF PREFERRED EMBODIMENT

Thermography is a non-destructive technique that uses infrared rays to measure and observe differential patterns of thermal distribution, in order to provide information regarding the operational condition of a component, equipment or process. It is a science that involves the use of electronic optical devices (thermographic cameras) to detect and measure radiation and correlate it with the temperature of the object's surface.

There are currently several thermographic cameras on the market and software for a detailed analysis of an object, as well as analysis on radiometric videos allowing an inspection of non-static objects. In the example described further below, the Flir T1020® thermal camera was used. The Flir T1020® thermal camera offers detailed and uniform images with very little image noise. FLIR Vision Processing® combines HD resolution, MSX® and UltraMax® image enhancement with FLIR's proprietary adaptive filtering algorithms to generate brilliant thermal images up to 3.1 million pixels. In addition, the T1020 is sensitive enough to detect temperature differences below <20 mK to provide clear, low-noise results that prevent one from ignoring potential problems during inspections.

Vertical mills (e.g. Vertimill® 1500HP, manufactured by Metso) is typically applied in a secondary grinding stage (although it can also be applied to a primary grinding stage), and is capable of grinding fine material (e.g. iron ore slurry) with particle sizes in the region of about 6 mm in diameter down to particle sizes in the region of 20 microns in diameter.

Figure 2A:
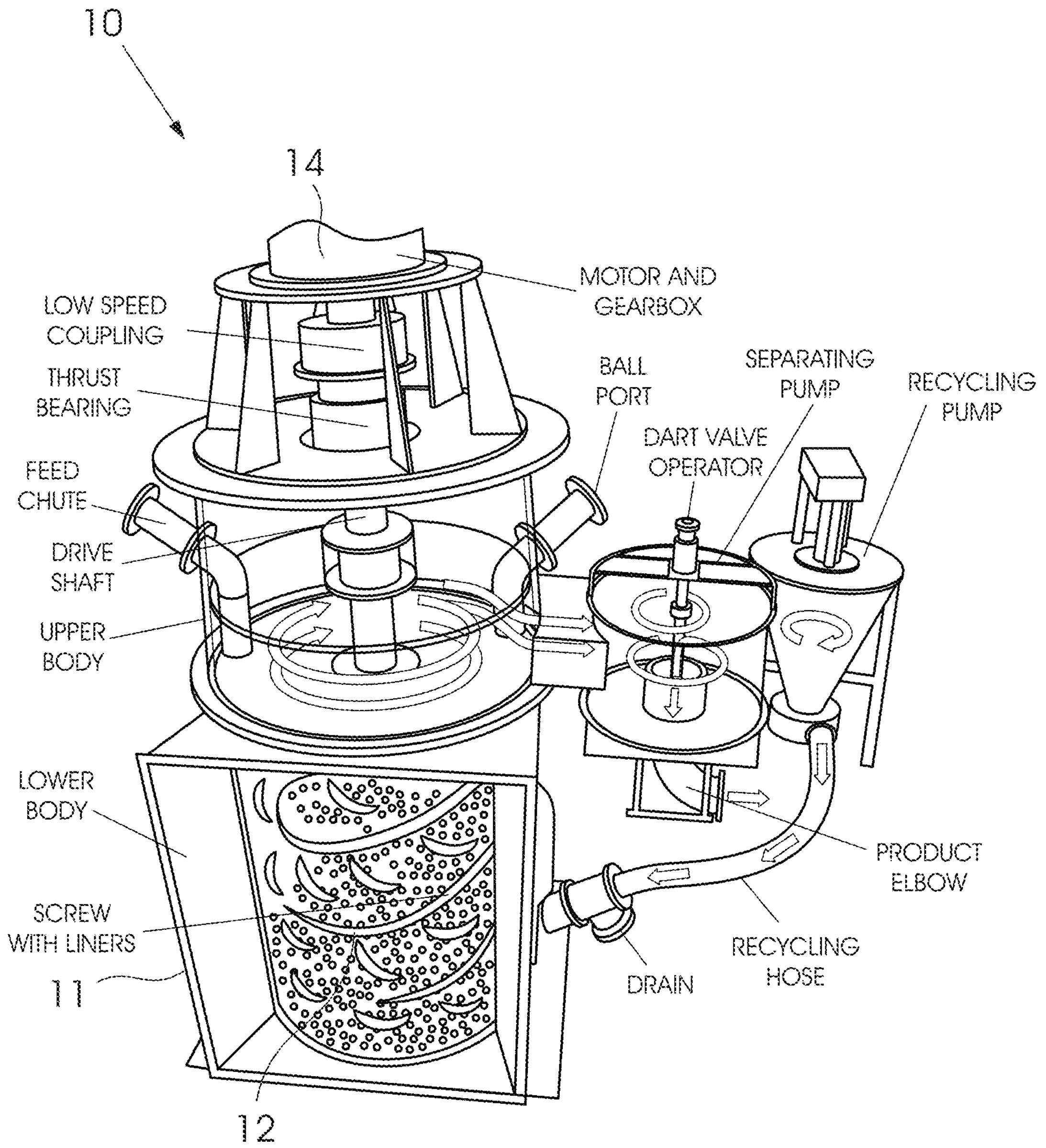
FIG. 2*a* shows a three dimensional view of a vertical mill.

A vertical mill 10 (illustrated in FIG. 2*a*) typically includes a housing/frame 11 in the form of a grinding chamber 11. A helical screw 12 is located inside the grinding chamber 11 and is rotatable about a vertical axis of rotation. A motor 14 is drivingly connected to the screw in order to rotate the screw 12 during operation. Grinding bodies, in the form of grinding balls (not specifically shown), are located inside the grinding chamber 11 in order to help grind feed material (e.g. iron ore slurry) which, in use, is fed into the grinding chamber 11 for the purposes of grinding the material.

Figure 2B:
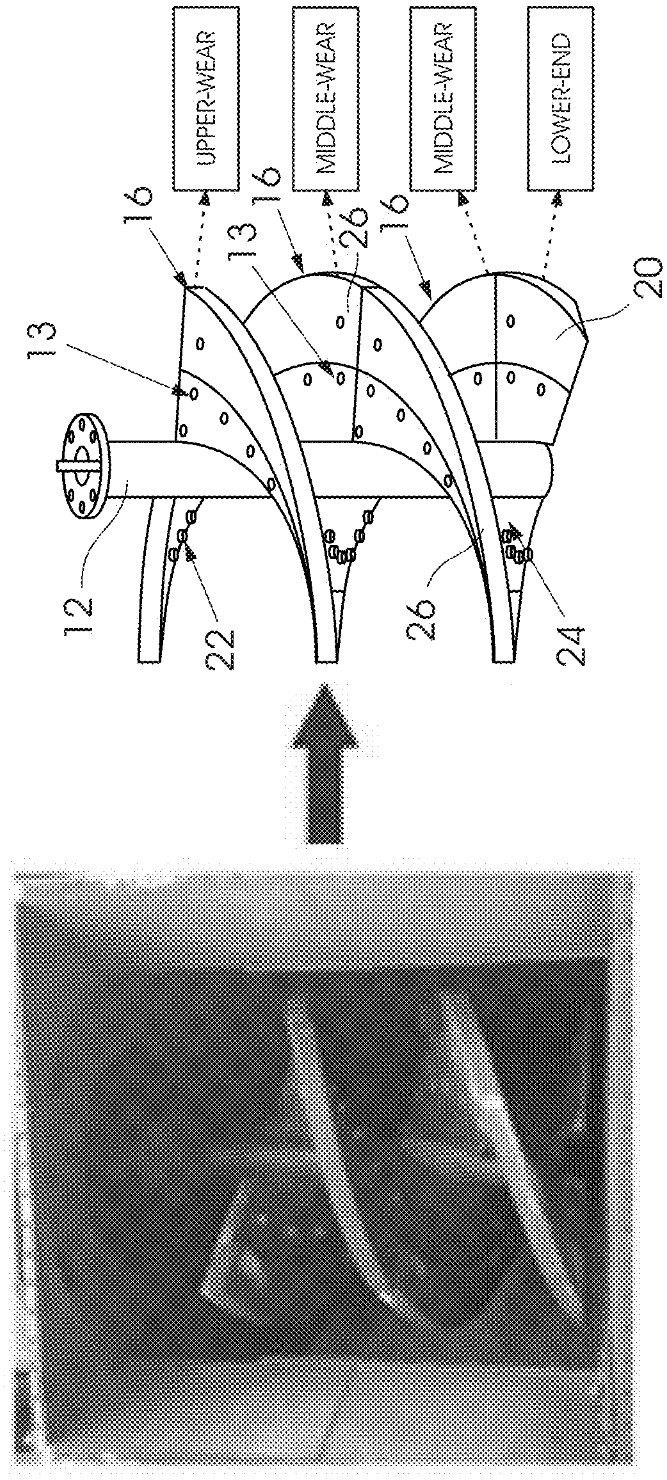
FIG. 2*b* shows a schematic illustration of a helical screw of the vertical mill shown in FIG. 2*a* (both in side view and in three-dimensional view)

Wear components in the form of helical wear linings or wear plates or wear coatings 16 are removably secured to the screw 12 (see FIG. 2*b*). A vertical mill 10 typically has two end wear plates/wear coatings/wear linings 18, 20 (hereinafter only referred to as the "wear plates 18, 20") which are secured to an operatively upper/top portion 22 and operatively lower/bottom portion 24 of the screw 12, respectively. The vertical mill 10 also includes one or more (preferably 6) intermediate wear plates/wear coatings/wear linings generally indicated by reference numeral 26 (hereinafter only referred to as the "intermediate wear plate 26"). The two end wear plates 18, 20 typically have a different geometry from the intermediate wear plates 26, due to the load lifting characteristic that this coating is subjected to during operation. The wear plates 18, 20, 26 are typically secured to the screw 12 by means of bolts and nuts generally indicated by reference numeral 13.

These wear plates 18, 20, 26 wear out over time and, as a result, tend to be the biggest maintenance cost for vertical mills 10. The wear plates 18, 20, 26 typically have an operational average of 3900 hours, with a total of 35 annual changes/replacements.

During operation the feed material inside the grinding chamber 11 is ground by the grinding balls through constant friction as a result of the vertical movement of the feed material, which is raised by the rotating screw 12 (e.g. a helical propeller) and the wear plates 18, 20, 26, which are installed inside the grinding chamber 11 (i.e. thereby generating wear through abrasion). Feeding is performed from a bottom of the grinding chamber 11 and a resulting product (of grounded material) is overflowed at a top of the grinding chamber 11.

The exact operation of a vertical mill 10 is well known in the industry and will therefore not be described in detail. For more information on the general operation of a vertical mill, reference is made, amongst others, to:

THE GRINDING EFFICIENCY OF THE CURRENTLY LARGEST VERTIMILL INSTALLATION IN THE WORLD, SAG Conference, Vancouver 2015, D. B. Mazzinghy, J. F. C. Russo, J. Lichter, C. L. Schneider, J. Sepulveda, and A. Videla5, SAG Conference Vancouver 2015 (https://www.researchgate.net/profile/Douglas_Mazzinghy/puplication/282648101_THE_GRINDING_EFFICIENCY_OF_THE_CURRENTLY_LARGEST_VERTIMILL_INSTALLATION_IN_THE_WORLD/links/562f929808ae8e1256875564/THE-GRINDING-EFFICIENCY-OF-THE-CURRENTLY-LARGEST-VERTIMILL-INSTALLATION-IN-THE-WORLD.pdf)

It is challenging to identify the wear of the wear plates 18, 20, 26 without operational stop and opening of the grinding chamber 11. Approximately 210 changes of wear plates 18, 20, 26 are made per year, in 35 annual openings. In this way, an impact of approximately 3% is generated on the physical availability of secondary grinding, which is one of the bottlenecks in production. In addition to the impact on the productivity, the maintenance also has an impact on safety, since workers are exposed to critical lifting and cargo handling activities during maintenance.

The operation of vertical mills 10 with marked wear on the wear plates 18, 20, 26 can generate a series of impacts, such as:

- Operational—(loss of efficiency in grinding, lower productivity and higher consumption of body grinders);
- Equipment—(shaft/screw wear, unscheduled stops); and
- Energy consumption—(equipment operating at a low production rate).

The inspection of wear plates 18, 20, 26 can have a 24 hour impact on productivity, since it takes about 8 hours for draining part of the grinder bodies and opening the door of the housing and about 16 hours to clean and remove the rest of the grinding bodies.

Due to the impacts of shutdown, opening and cleaning, in most inspections of the coating condition, inspectors ended up deciding on the replacement of helical coatings, even those still in operational conditions.

The replacement of the wear plates 18, 20, 26, closing of the equipment and replacement of the grinding bodies, takes about 96 hours. By adding this time to the 24 hours for opening and cleaning, the mill 10 has 120 hours of unavailability due to maintenance.

This deficiency in the inspection of the wear plates 18, 20, 26 is therefore a chronic problem which has a big impact on maintenance cost, as well as the physical availability of the vertical mill 10.

Figure 3:
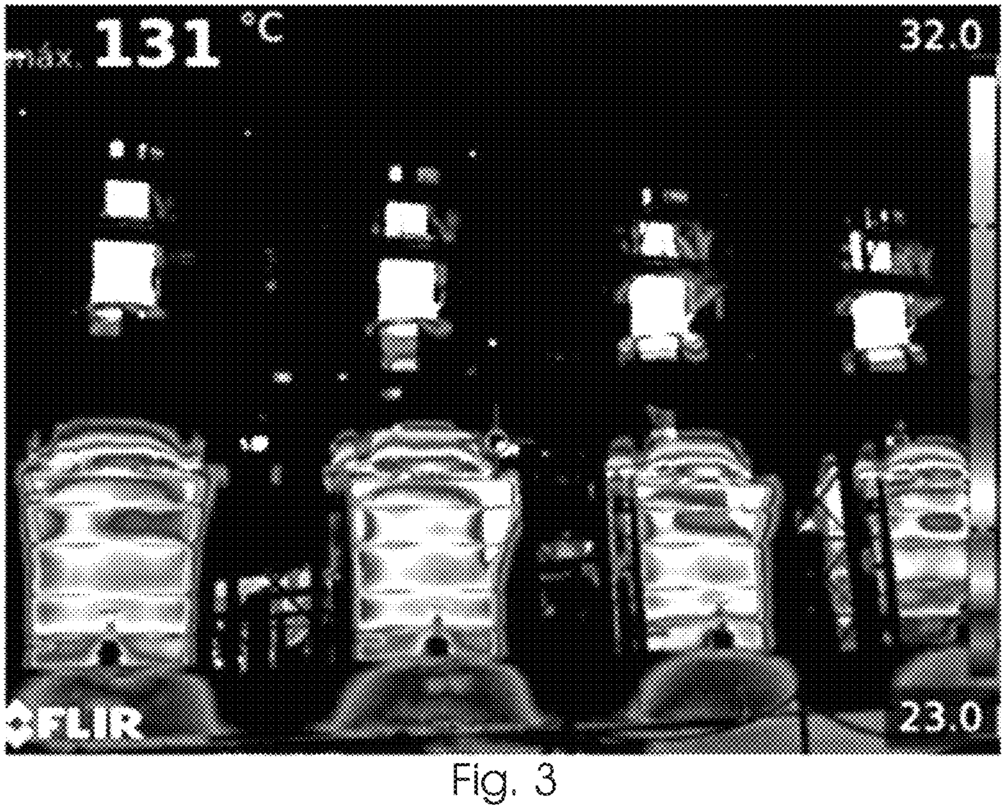
FIG. 3 shows thermograms of four vertical mills.

In order to address this issue, the Inventors investigated the use of thermography/thermographic inspection. With the application of thermography, the inventors sought to identify a thermal pattern that represents the wear behaviour of the wear plates 18, 20, 26. The application of the thermography technique started from a thermal image of 4 vertical mills, where a thermal variation in the grinding chamber 11 of the mills were observed. Reference is in this regard made to FIG. 3.

Figure 4:
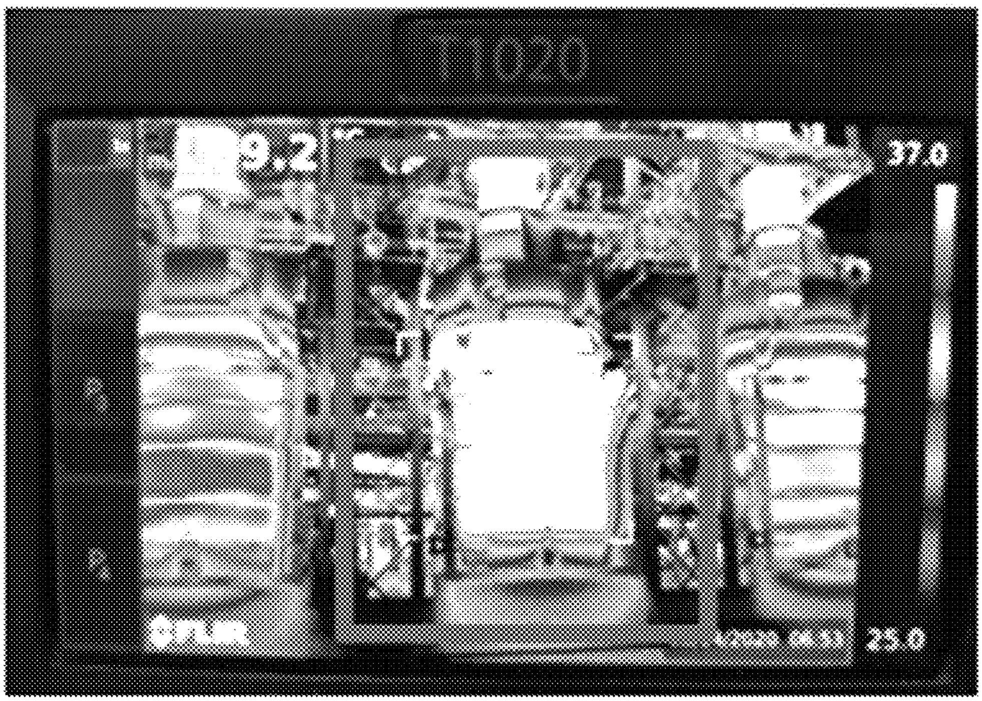
FIG. 4 shows a thermogram of a vertical mill with a possible blockage/obstruction.

After identifying the thermal variation in the surface of the grinding chamber 11, a comparison was made in order to determine if the process variables could influence the thermogram or if this thermal variation could be correlated with the wear of helical coatings (i.e. the wear plates 18, 20, 26). As a result, it was found that it was possible to identify problems of obstruction in the feeding of the mills (see specifically FIG. 4). When the vertical mill 10 has an abnormality in its feeding, the friction between grinding bodies and wear plates 18, 20, 26 ends up releasing energy and, by conduction, heats the entire housing 11 with a temperature above 42° C.

It should be noted that a vertical mill 10 operating abnormally in its feeding will generate operational impacts, accelerating the wear of the wear plates 18, 20, 26 and result in increased electricity consumption. It is therefore important to identify this abnormality (i.e. an obstruction within the grinding chamber 11) as soon as possible.

Figure 5:
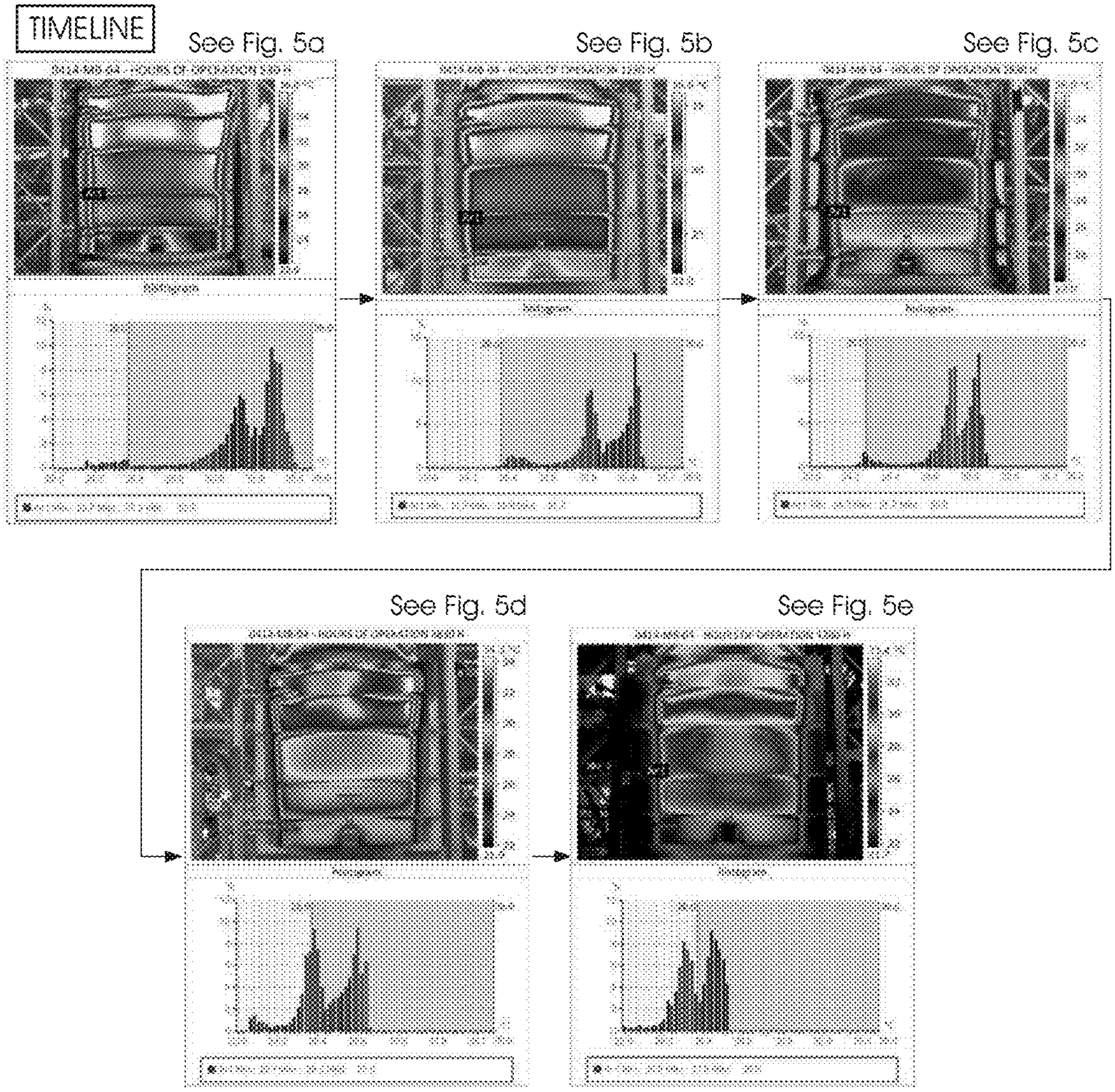
FIG. 5 shows five thermograms taken of the same vertical mill at weekly intervals (i.e. the thermogram on the far left was taken in week 1 while the thermogram on the far right was taken in week 5), as well as their associated histograms which were generated through appropriate software used/implemented by the system in accordance with the invention
Figure 5A:
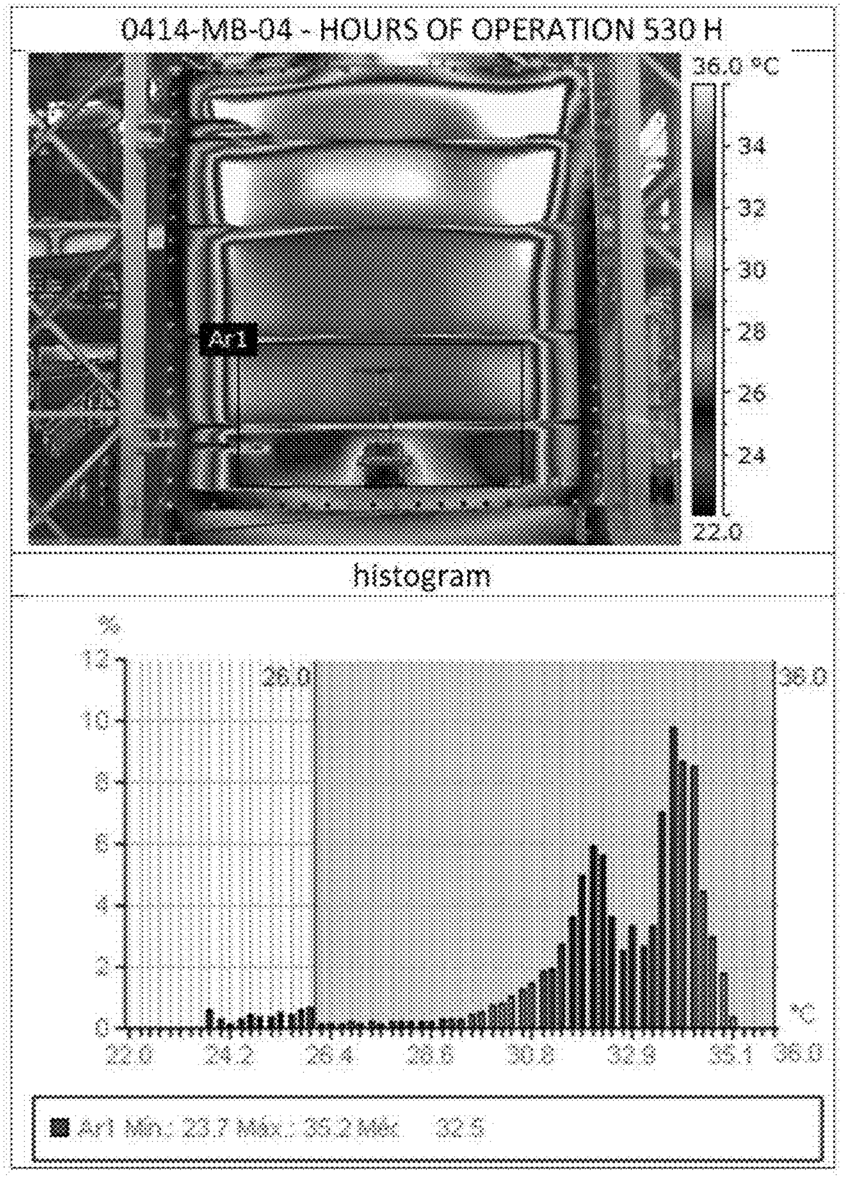
(FIGS. 5*a-e* show each thermogram and associated histogram in more detail)
Figure 5B:
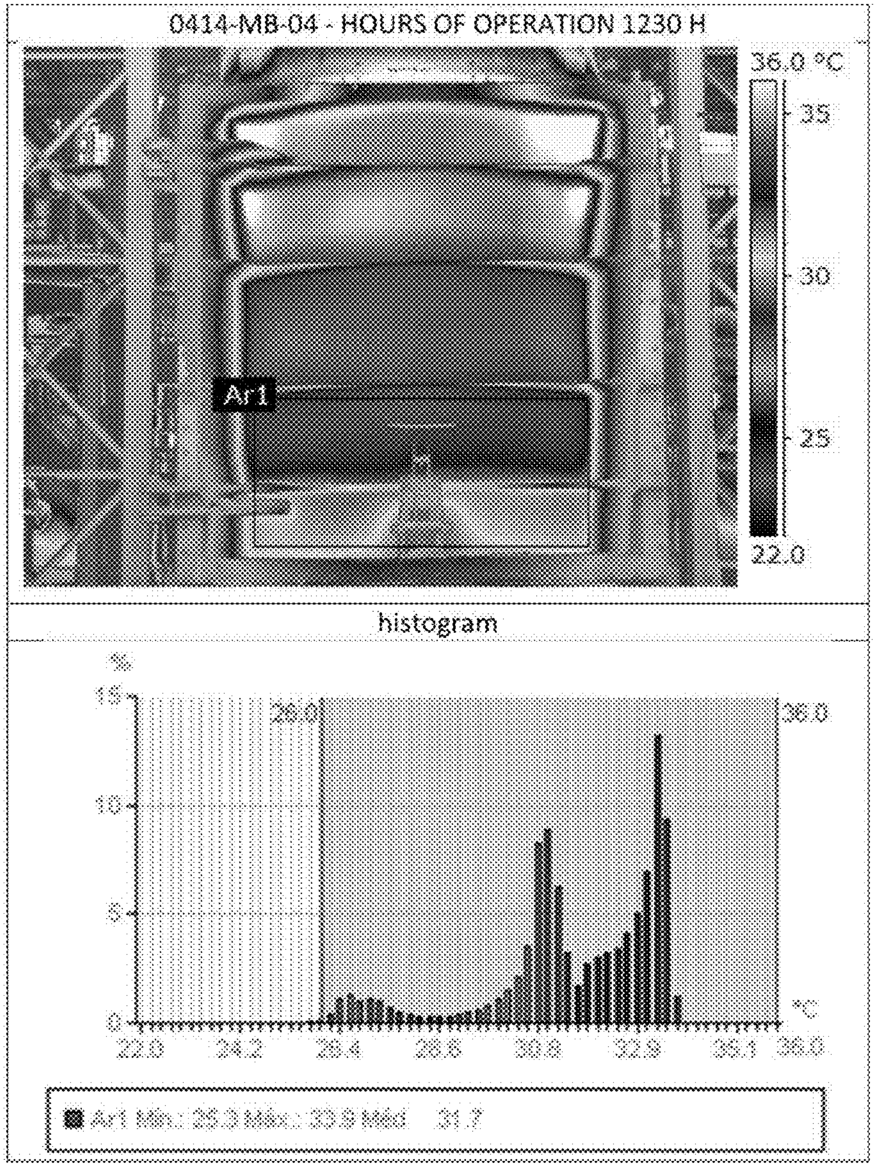
Figure 5C:
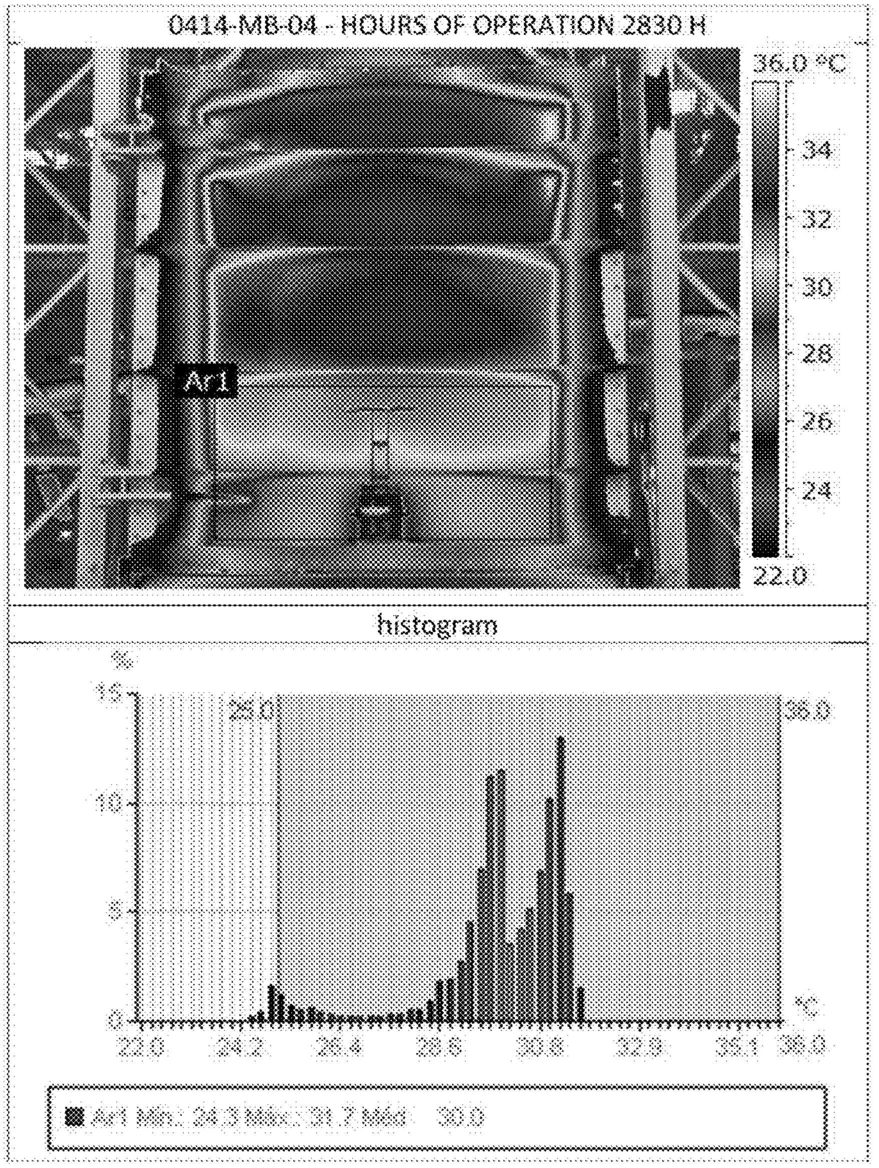
Figure 5D:
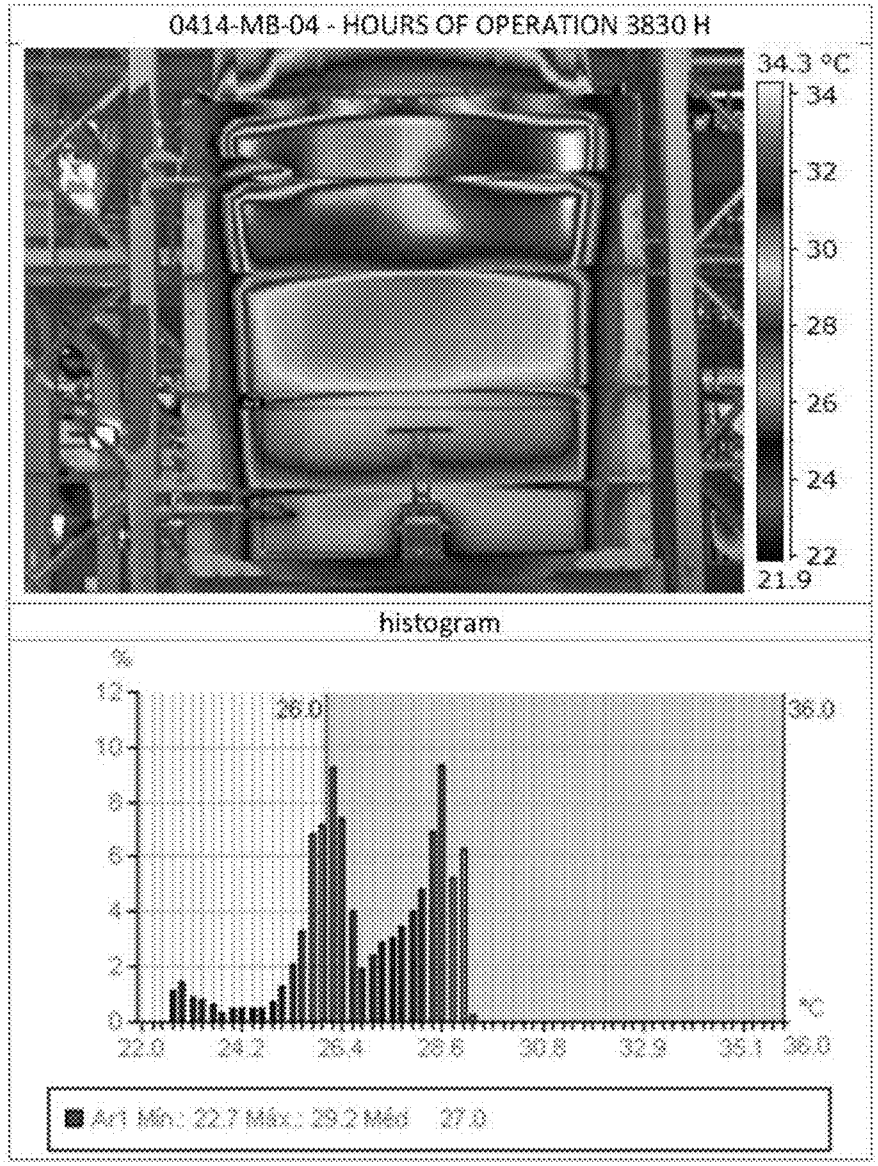
Figure 5E:
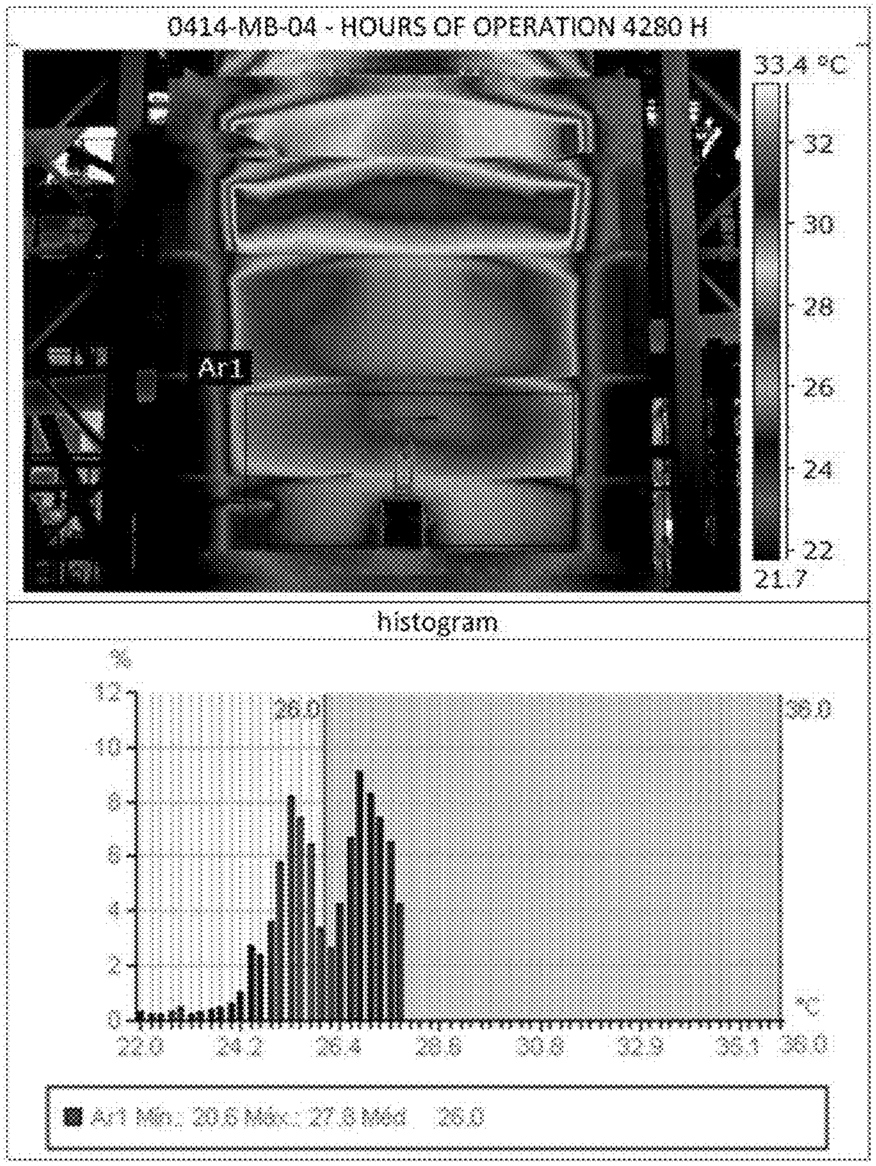

A weekly thermographic monitoring of a vertical mill 10 (more specifically a Vertimill®) was saved and thermograms thereof were analysed, in order to create a timeline of a thermal profile after x hours of operation (see FIG. 5).

Figure 6A:
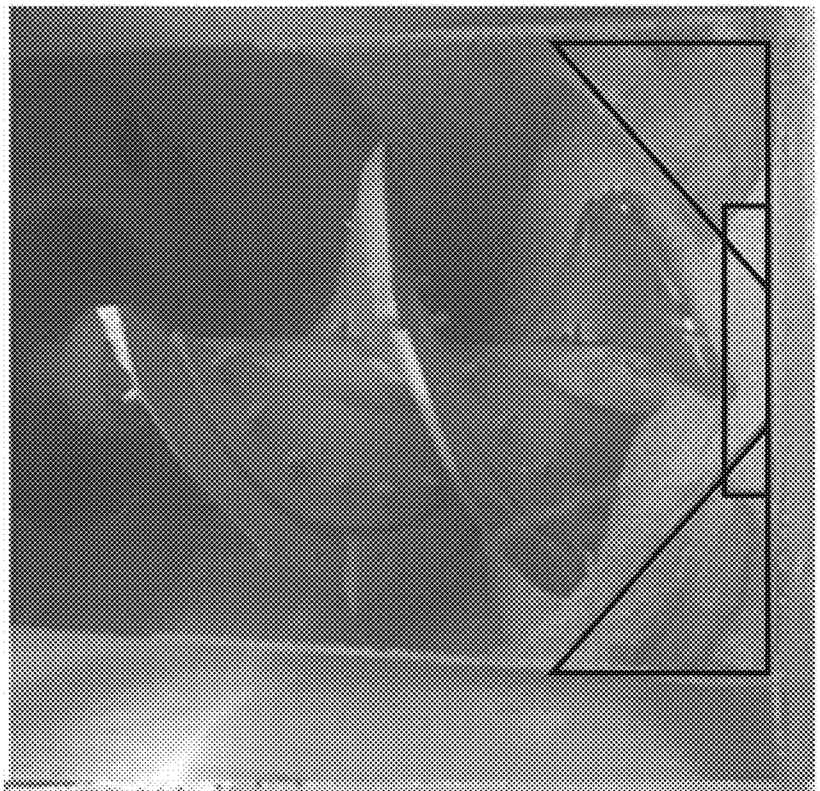
FIG. 6*a* shows a photo of new wear plates which are used by a vertical mill.
Figure 6A:

Systemic monitoring of all changes in wear plates 18, 20, 26 (i.e. helical coatings) were carried out over a period of time through a physical inspection (i.e. by essentially performing a maintenance function as described above). In these maintenances, it was observed that, due to the wear of the wear plates 18, 20, 26, the feed material with iron ore slurry and grinding bodies had sedimented at the bottom 23 of the grinding chamber 11, not homogenizing with the rest of the circulating load. Due to this characteristic, there was no/little friction and, therefore, there would be no/little energy transformation in this region, where we call "dead load"/"dead zone" 25. This feature can therefore be seen as an indication of an end-of-life of the wear plates 18, 20, 26. Reference is in this regard made to FIGS. 6*a* and 6*b* which depict photos of vertical mills 10 with new wear plates 18, 20, 26 (FIG. 6*a*) and wear plates 18, 20, 26 which have reached their end-of-life and which has material sedimentation at the bottom 23 of the grinding chamber 11.

Figure 7:
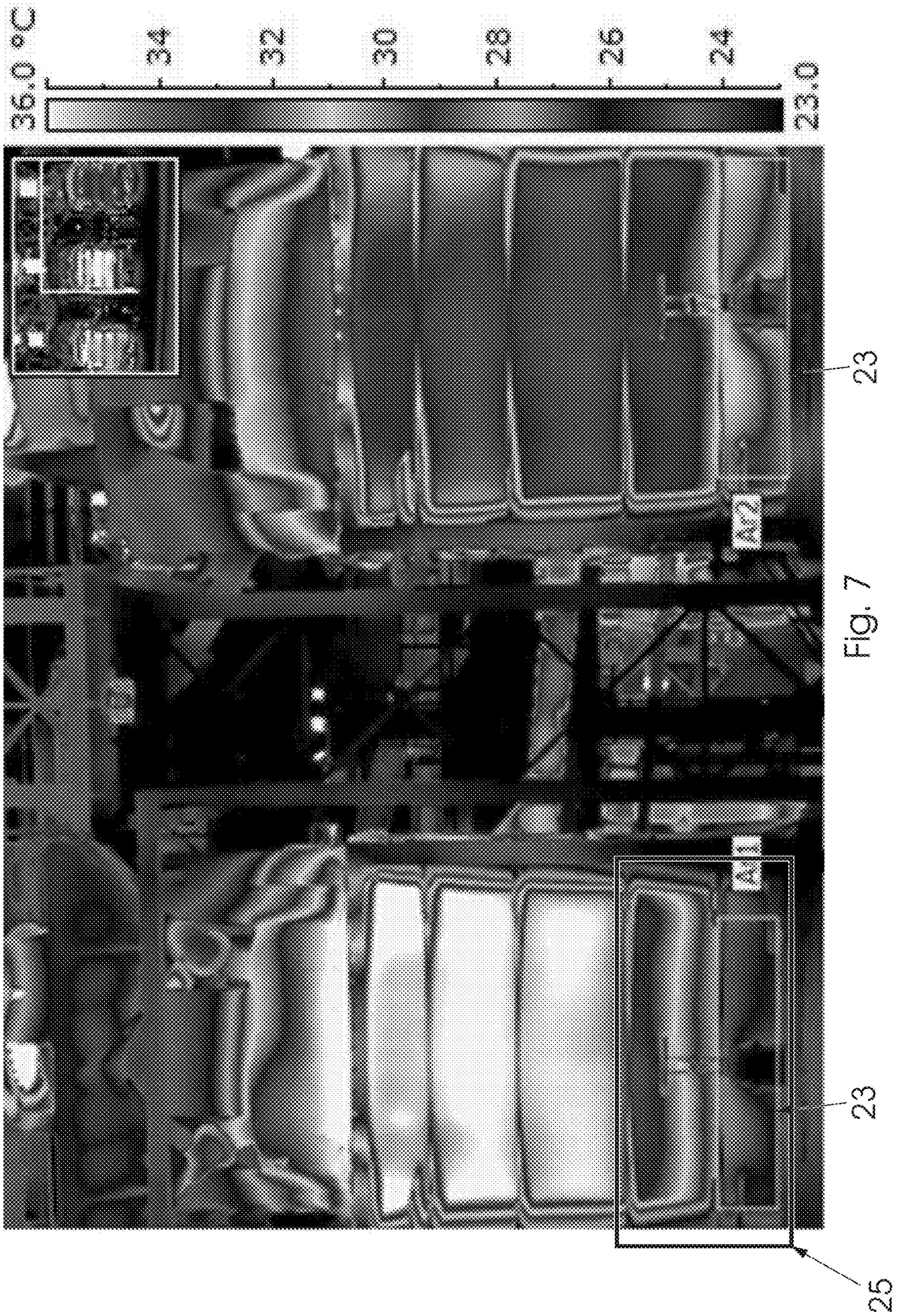
FIG. 7 shows thermograms of two vertical mills, where the mill on the left has wear plates in normal operating conditions and the mill on the right has wear plates with some wear characteristics.

As the wear of the wear plates 18, 20, 26 accelerates, the area of the dead load/zone 25 increases and, consequently, the heat transmission in that region will be smaller. FIG. 7 shows a comparison of a vertical mill 10 which has wear plates 18, 20, 26 in normal operating conditions (the vertical mill on the right) and a vertical mill 10 which has wear plates 18, 20, 26 with some wear characteristics (the vertical mill on the left).

As a result, it was found that thermographic inspection was possible due to the variation of the thermal gradient in the grinding chamber 11. This variation occurs due to the formation of a dead load/zone 25 of the grinding bodies and material at the bottom 23 of the grinding chamber 11. This is as a result of wear of the wear plates 18, 20, 26 which results in a gradual loss of lifting capacity of the mill load, thus creating a dead load/zone 25 of sedimented material at the lower/bottom end 23 of the grinding chamber 11.

In order to investigate the implementation of thermographic inspection for vertical mills 10 (more specifically a Vertimill®) the following recommendations where established during a practical experiment:

Flow rate was checked.

Percentage of solids and electrical current of the equipment/mill 10 were checked;

The hours of operation of the wear plates 18, 20, 26 were monitored (a log of the operating time since the last coating exchange were kept);

An emissivity of the thermographic camera should preferably be set at 0.95;

A thermographic camera 30 should be set at a set distance away from the housing 11 (e.g. at a distance of 11 meters (see reference numeral 32 in FIG. 1));

The digital thermal photos, videos and thermograms of a front of the housings 11 should be recorded during the inspections;

The results of the digital thermal photos, videos and thermograms should be downloaded onto a software platform, such as the FLIR Tools Software;

Generate reports with the prioritization of changing thermographic camera.

Figure 8:
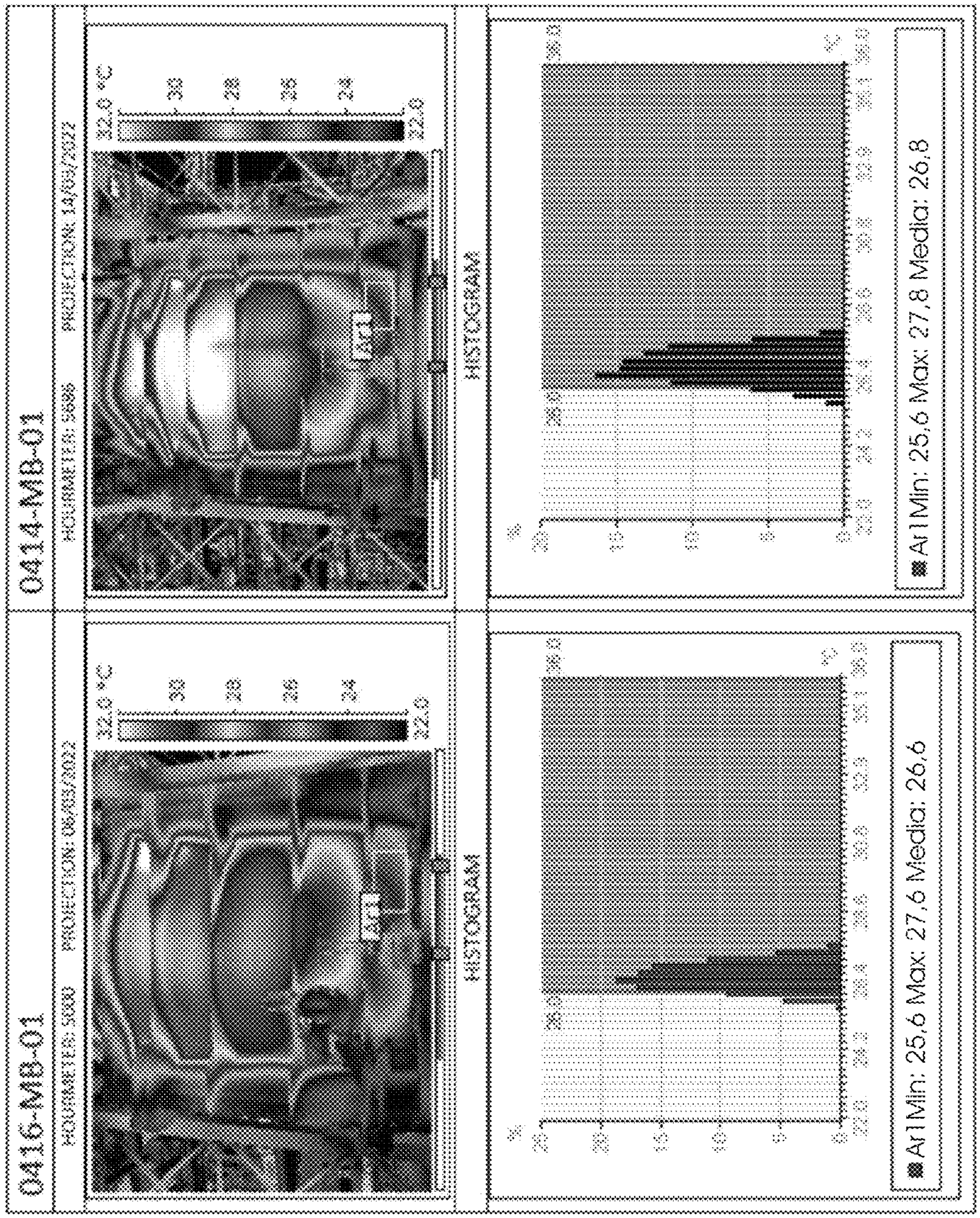
FIG. 8 shows a side-by-side comparison of two different vertical mills, wherein the comparison includes thermograms of the two mills, as well as their associated histograms.

Monthly thermographic inspections were carried out where the order of intervention/inspection for the vertical mills 10 were specifically defined. The activity was carried out with a range of 50 days, with the inspection being carried out between the 5th to the 12th of each month and the result showed which equipment had wear characteristics at the level that replacement of the coating will be needed in the following month. As can be seen in FIG. 8, the mill named "0416-MB-01", with 5000 hours in operation, has a thermogram with higher levels of wear than the mill named "0414-MB-01" with 5686 hours of operation. Thus, it was mapped that preventive maintenance had to be carried out on "0416-MB-01" for exchanging the coatings, even with less operating hours than the mill named "0414-MB-01.

Another important point in the evaluation is the thermographic history of each vertical mill 10, compared to the hours of operation of the equipment. Any abrupt variation in the thermal profile can be related to some variation in the process or obstruction of the vertical mill supply.

With the application of thermographic inspection to the wear plates 18, 20, 26 of the vertical mills 10, a significant increase in operational reliability was obtained, since this process makes it possible to define the level of wear of the wear plates 18, 20, 26 and thus avoid equipment/mill stops and openings when the wear plates 18, 20, 26 have not yet reached the level of wear considered critical for its operation.

By utilizing this methodology, the Inventors were able to increase an average hour of operation in vertical mills 10. In the 7th generation of exchange, there were vertical mills 10 with more than 5680 operating hours.

Process Variables

To support the interpretation of thermographic data, it is important that process variables are uniform, such as:

Slurry pump flow;

Solid percentage; and

Electrical current of the equipment.

The reason for this is that:

A variation in the flow influences the residence time of the material inside the mills 10 and this consequently affects the thermal distribution. Generally, the flow of the pumps is in the 1500 to 1700 $m^3$ range. When identifying a variation greater than the mentioned limits, a new thermal evaluation should preferably be performed (after the flow has stabilized).

Figure 9:
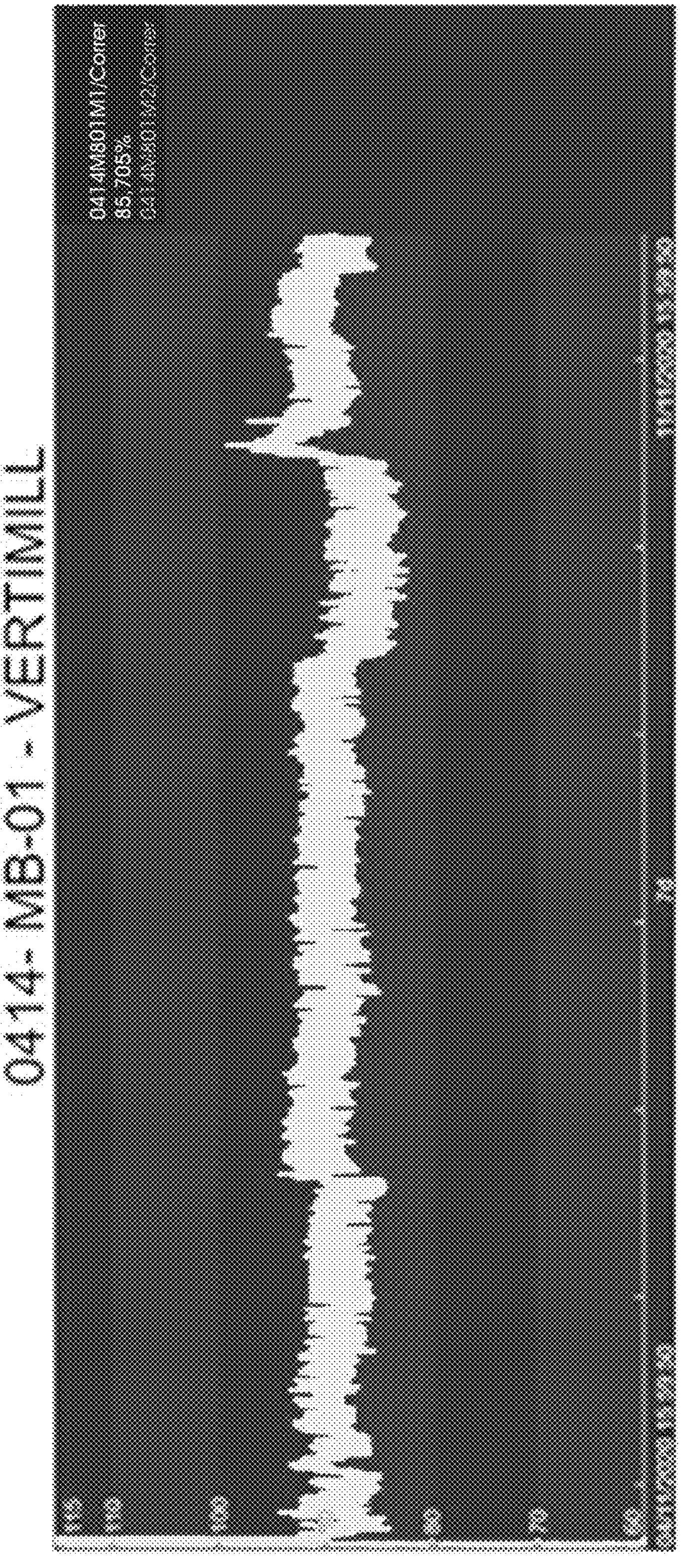
FIG. 9 shows a graphical example of how current in a vertical mill varies over time.

The equipment's current (i.e. the current powering the motor which in turn turns the screw) should be between 80 to 95% of rated current. Below 80% it is characteristic of low feeding or low level of grinding bodies. Above 95%, it can indicate a high level of grinding bodies inside the grinding chamber 11 or it can indicate an obstruction in the feeding. When identifying a variation higher than the mentioned limits, a new thermal evaluation should preferably be performed (after stabilizing the current). FIG. 9 shows a graphical example of how the current varies over time, whereby the Y-axis refers to the percentage (%) of the rated current.

The solid percentage should be between 70% and 80% for the equipment. If a change in the percentage of solid is noticed, a new thermal evaluation should preferably be performed, preferably 01 hour after normalization. If there is sunlight, a new inspection on the next day is recommended.

Criteria for Thermographic Analysis

To perform the thermographic inspection, it is essential that the equipment (i.e. the mill 10 and its components) is not under the influence of sunlight, and the inspection should preferably be performed in the morning. The ambient temperature is measured and registered using a thermo hygrometer. This measured temperature is then used as a reference temperature in the analysis of the thermal profile.

Figure 11:
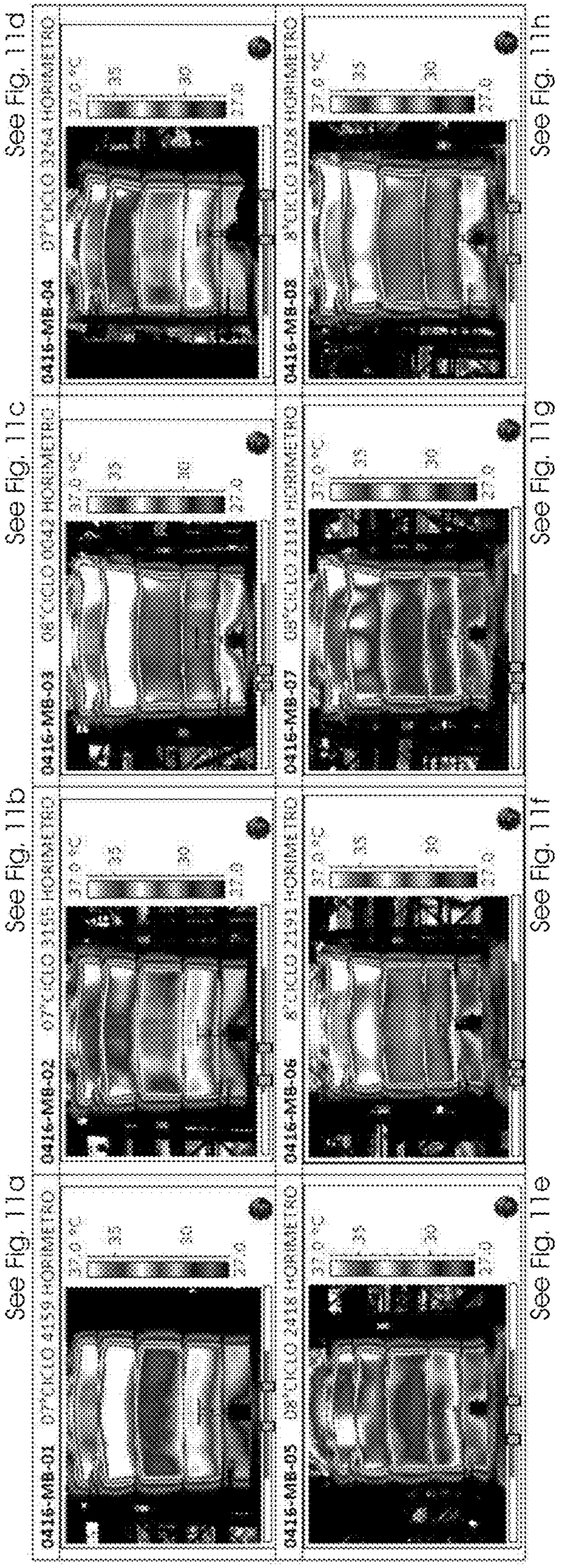
FIG. 11 shows thermograms of eight different vertical mills
Figure 11A:
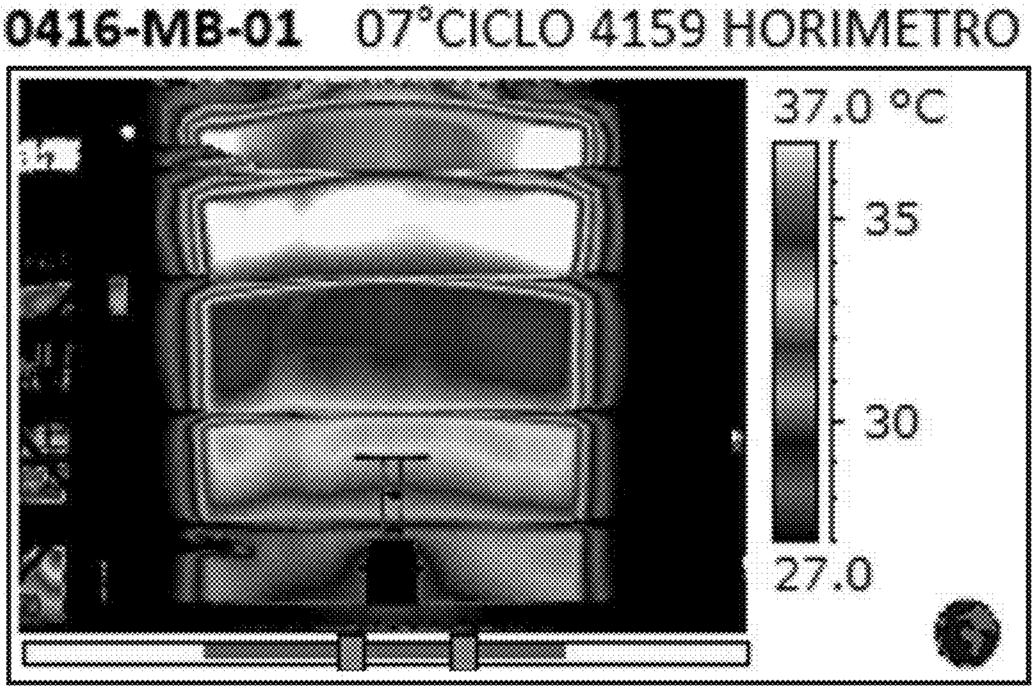
(FIGS. 11*a-h* show each thermogram in more detail)
Figure 11B:
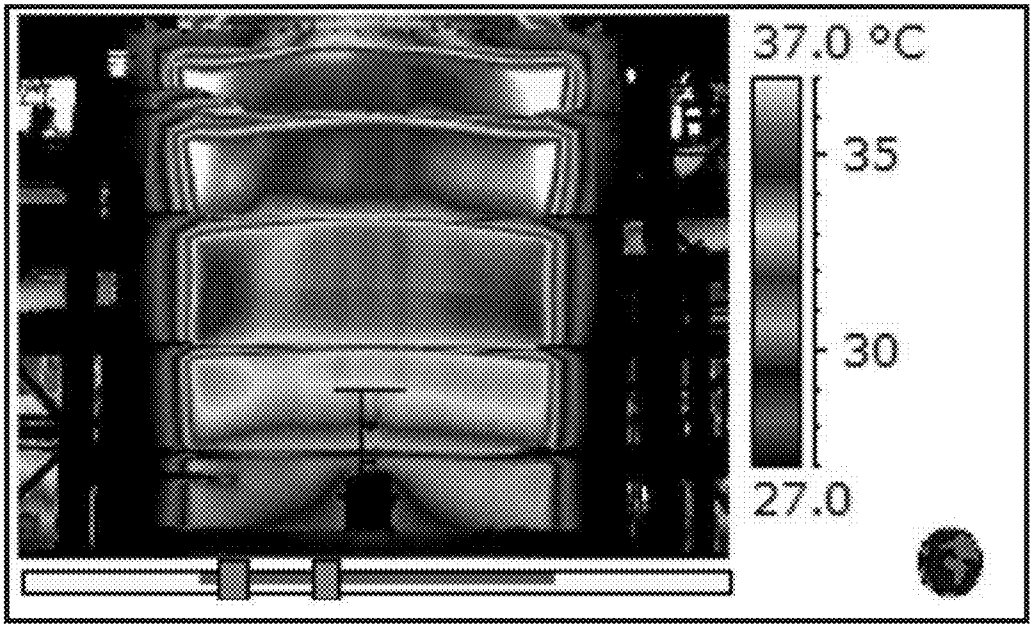
Figure 11C:
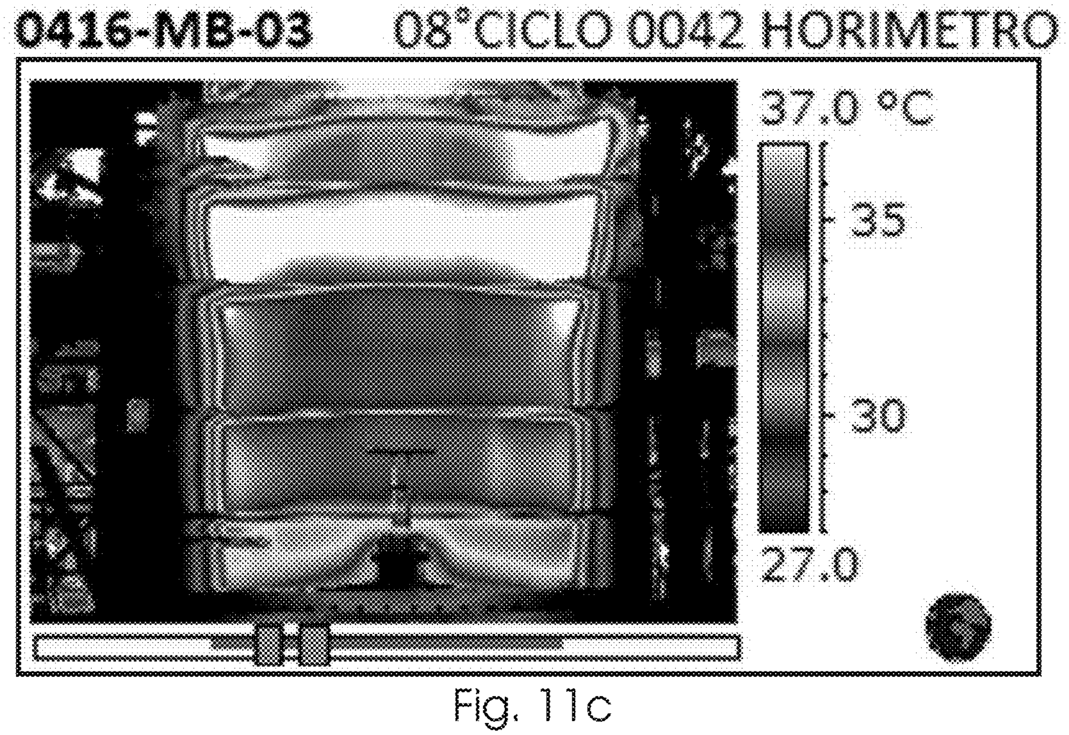
Figure 11D:
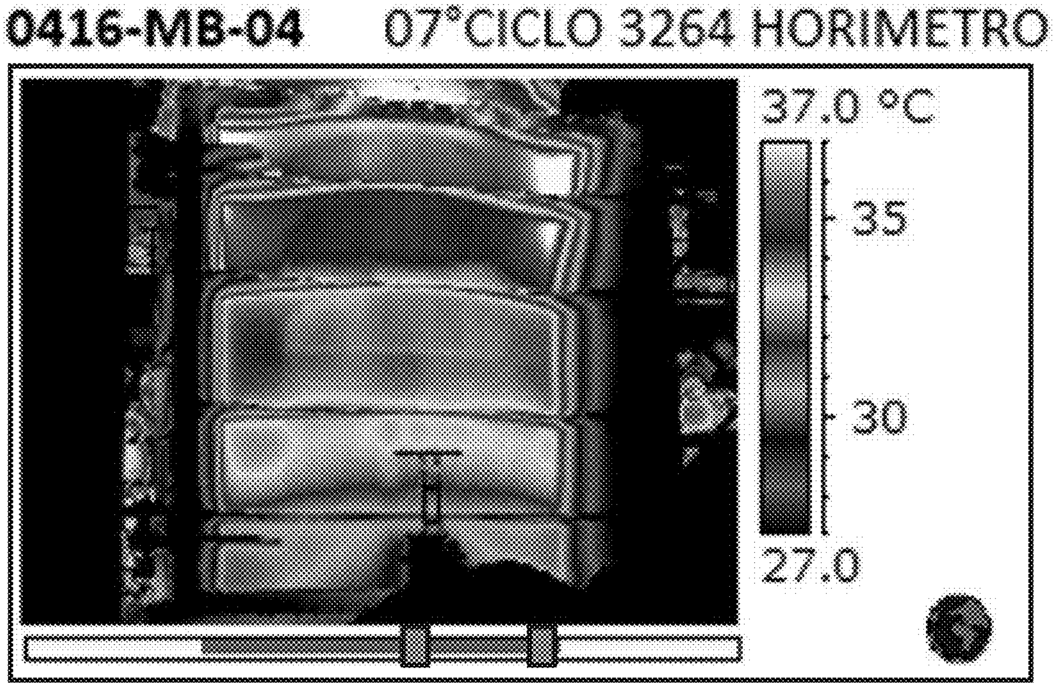
Figure 11E:
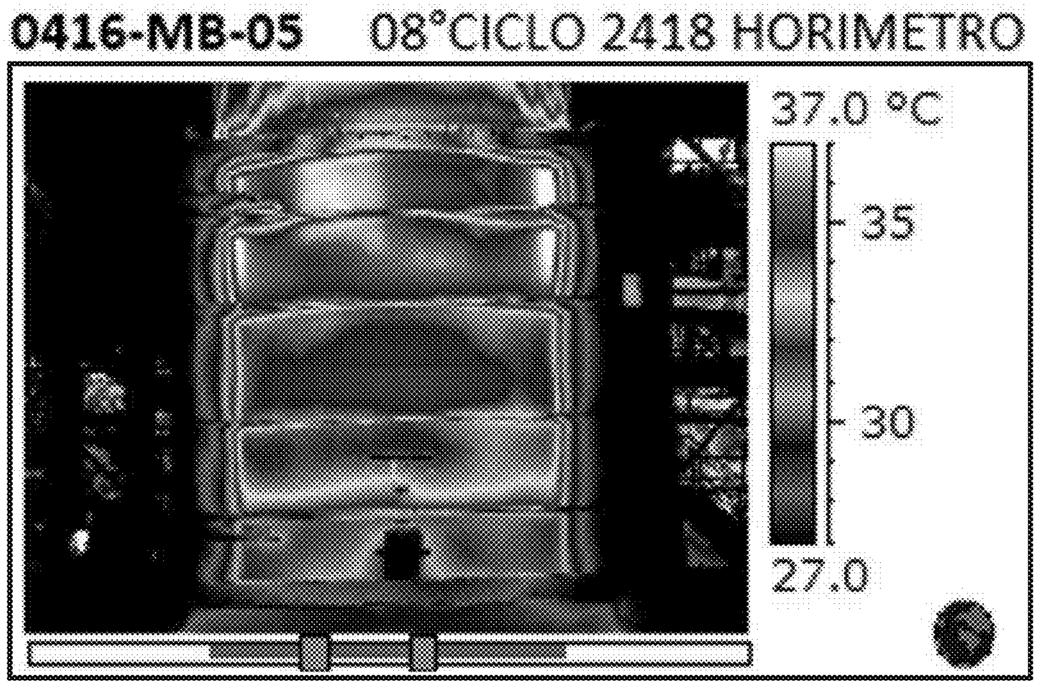
Figure 11F:
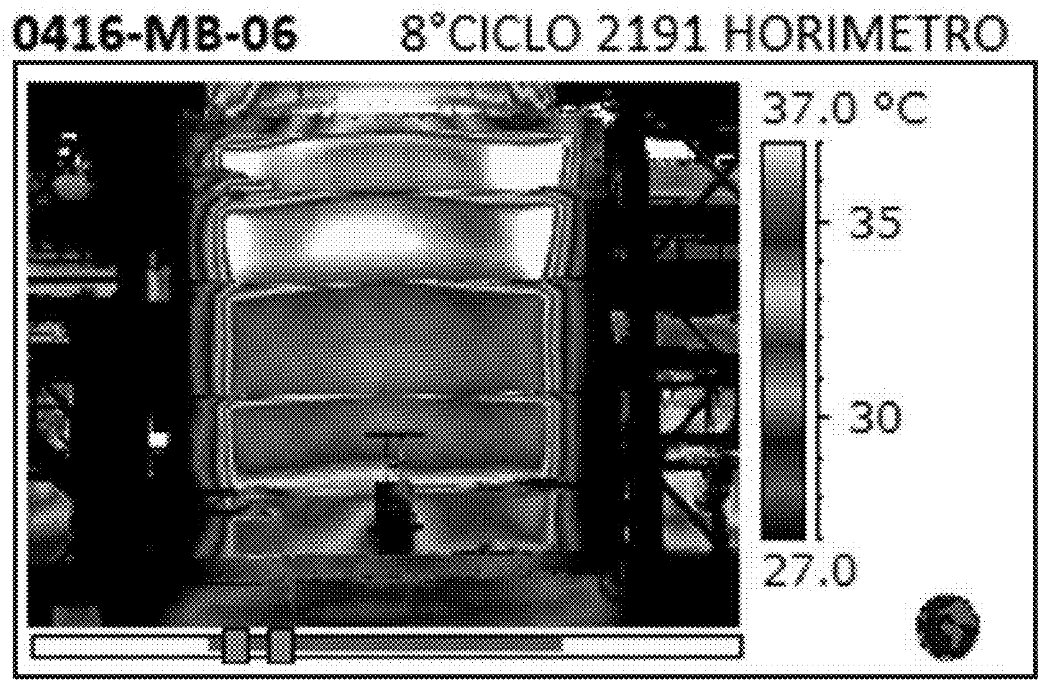
Figure 11G:
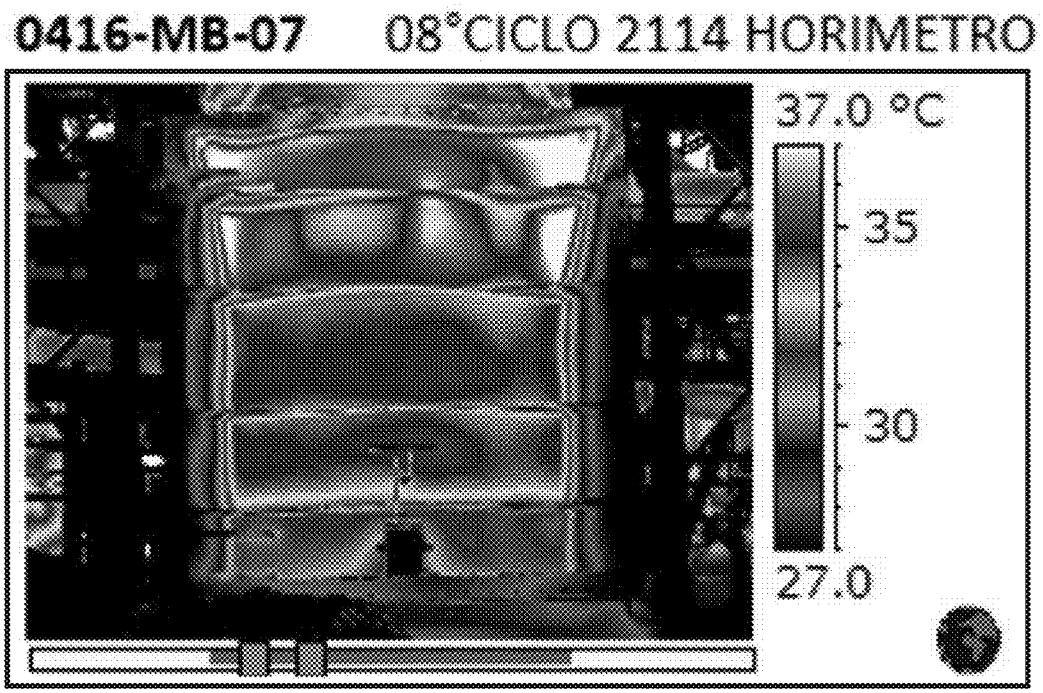
Figure 11H:
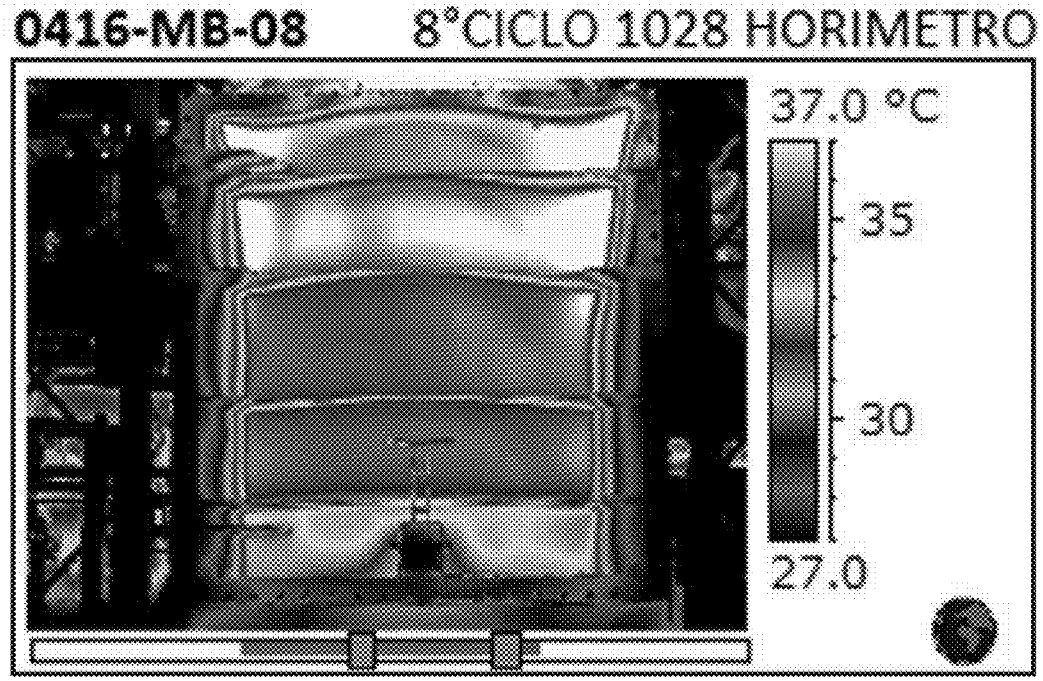

Thermograms are performed on a front part of the vertical mills, from a set distance 32 away, such as 11 meters away (see FIG. 2), using a thermographic camera 30. The thermograms are then saved and analysed within a software platform, such as the Flir Tools Software. Reference is in this regard made to FIG. 11 which shows the thermograms of 8 vertical mills (illustrated using the Flir Tools Software). It is important that all thermograms should be in the same quadrant and on the same thermal scale (as shown in FIG. 11).

As the projection of changing the coating/lining is carried out with a horizon of 50 days, it is important to verify that an equipment may have an extra 1200 hours of life time for the coatings, if it is scheduled for the end of the following month, otherwise, the maintenance must be carried out before this deadline. Therefore, all equipment with an hour meter greater than 2800 hours of operation will be able to enter this schedule and with this criterion the equipment that is in the exchange zone will be classified. After this classification, the characteristic of each thermal profile of that equipment is evaluated with an hour meter greater than 2800 operating hours.

By using the software, an operatively lower area/portion of the thermogram is selected (see reference numeral 37). A histogram is then generated for the selected area 37, which illustrates the thermal distribution of that area 37. The histogram can typically be illustrated below the thermogram as shown in FIG. 12.

A reference temperature can be selected as a lower limit for normal operating conditions. More specifically, the reference temperature selected can be 2° C. above ambient temperature.

Figure 12:
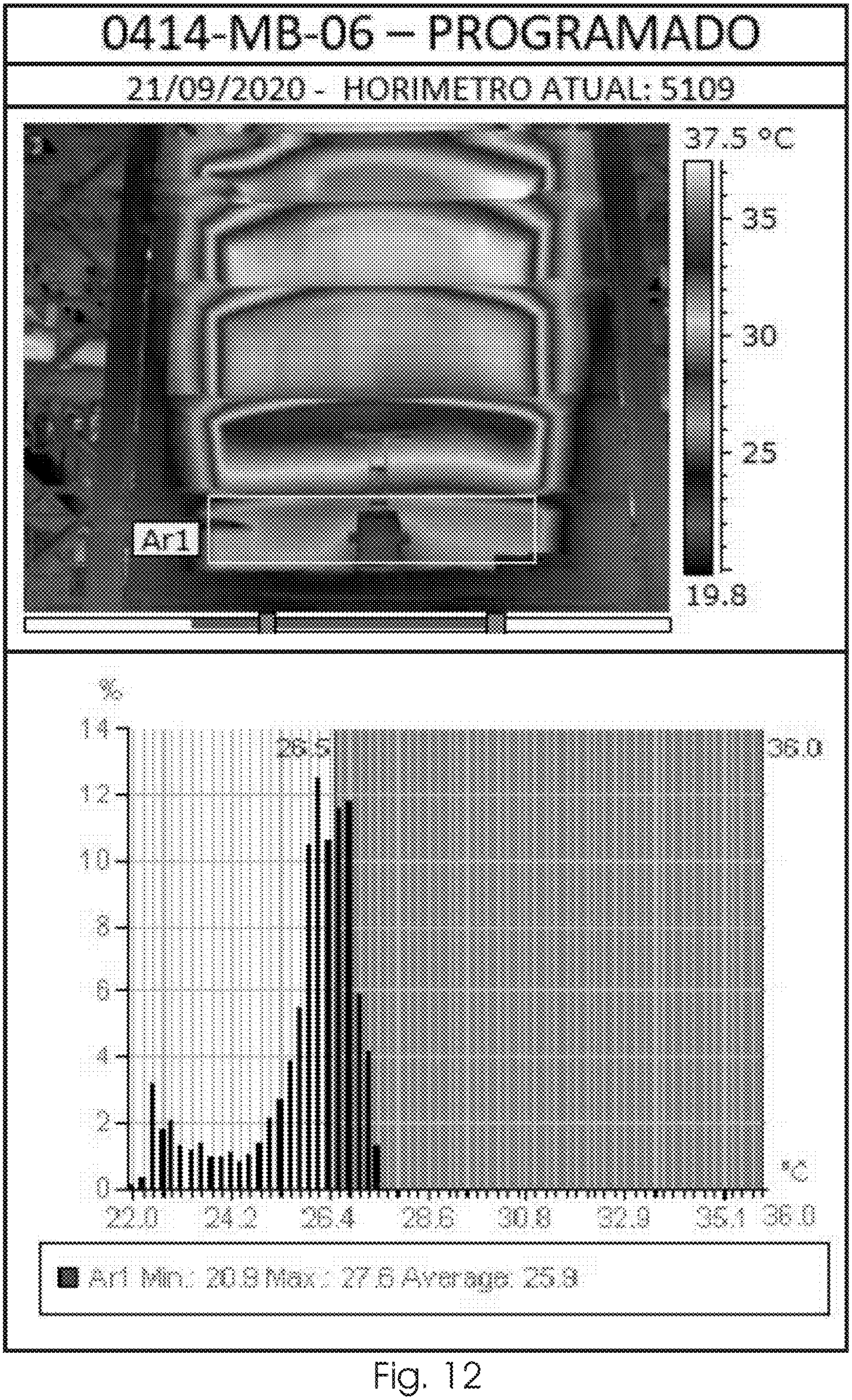
FIG. 12 shows a thermogram of a vertical mill and its associated histogram directly there below.

In the example illustrated in FIG. 12, the ambient temperature at the time of inspection was 25° C., with the operating limit (i.e. the reference temperature) being 27° C. (i.e. 2° C. above ambient temperature). In the area marked in the histogram (see reference numeral 39—typically marked by an analyst), the temperature with the greatest influence is 28° C. It is estimated that in order for this temperature to reach the threshold of 27° C., it will take about 30 days of operation of this equipment, so this is the condition to schedule maintenance on this equipment (i.e. the wear plates 18, 20, 26 inside the housing 11 of the mill 10). In this regard, it should be noted that the estimate of 30 days was defined imperically, after several tests. It should also be noted that the value of difference of temperature (i.e. how long it will take to change from one temperature reading to another temperature reading) will vary depending on the size of the mill. This can typically be calculated by an analyst.

Figure 13:
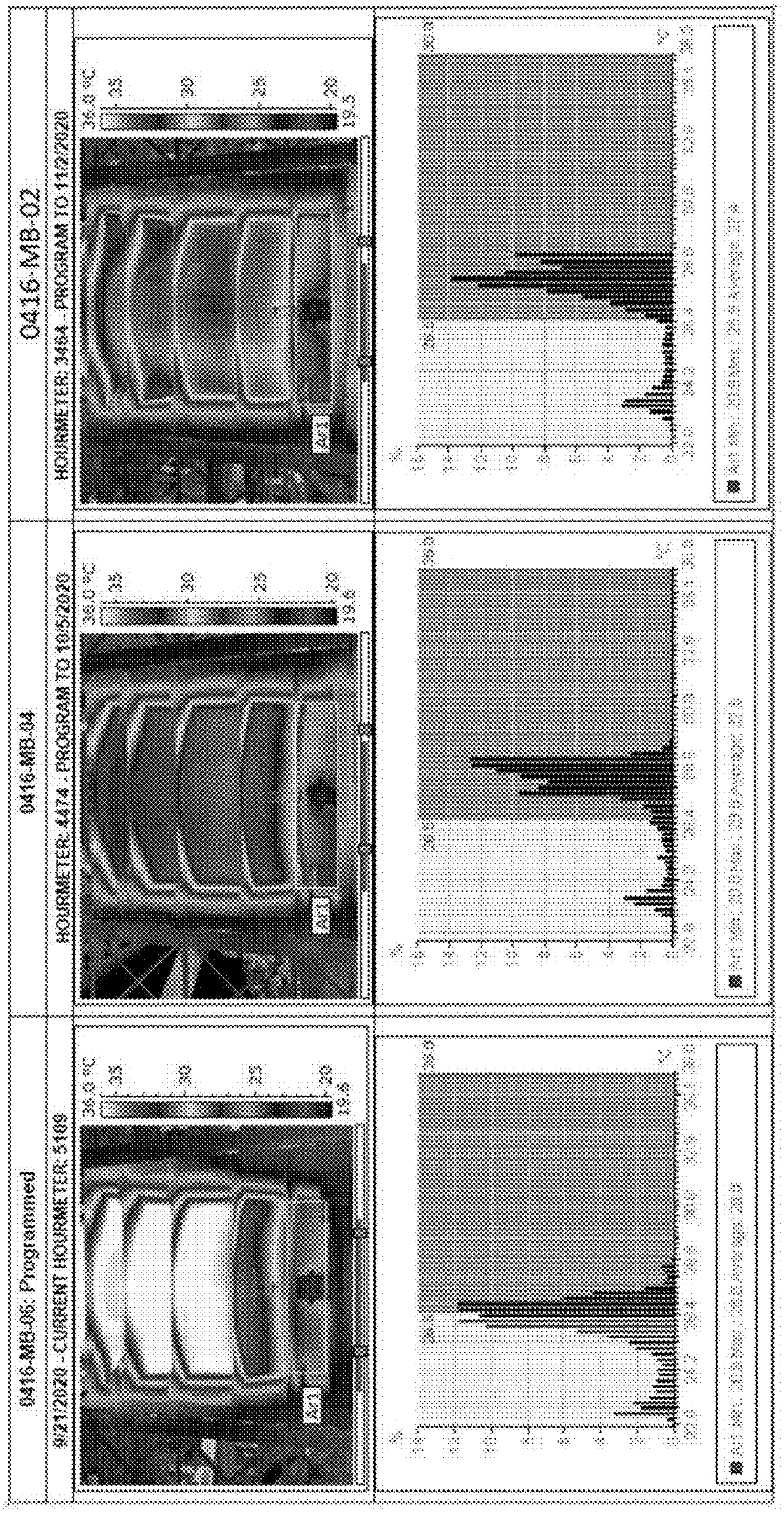
FIG. 13 shows examples of three different thermograms (in respect of three different vertical mills), where a reference temperature of 26.5° C. was selected.

FIG. 13 shows further examples of other vertical mills 10, where the reference temperature has been selected as 26.5° C. (this is typically selected by the user within the software). More specifically, FIG. 13 shows a comparison between three different mills, wherein each mill is programmed for replacing its coatings at a specific time (e.g. the first mill, 0414-MB-01, that has a maximum temperature about 26.5° C. (as seen from the thermogram), has 10 days left until maintenance is required, while the other two mills have 30 ("0414-MB-06") and 40 days ("0416-MB- 01") respectively.

In order to help calibrate the system in accordance with the invention, the level of wear of the wear plates 18, 20, 26 can be checked during maintenance and compared with the latest thermogram (see FIG. 14). In this regard, it should be noted that a limit temperature to replace the coatings is defined. When conducting maintenance to replace the coatings, the level of wear is measured to see if it has useful area. If it is found that the coating still has useful area to work, a new limit of temperature is defined, so that the coating can work for more time, in future. This was done several times, during the development of the present invention, until an optimal point was reached.

Feed Obstruction Characteristic

Figure 15:
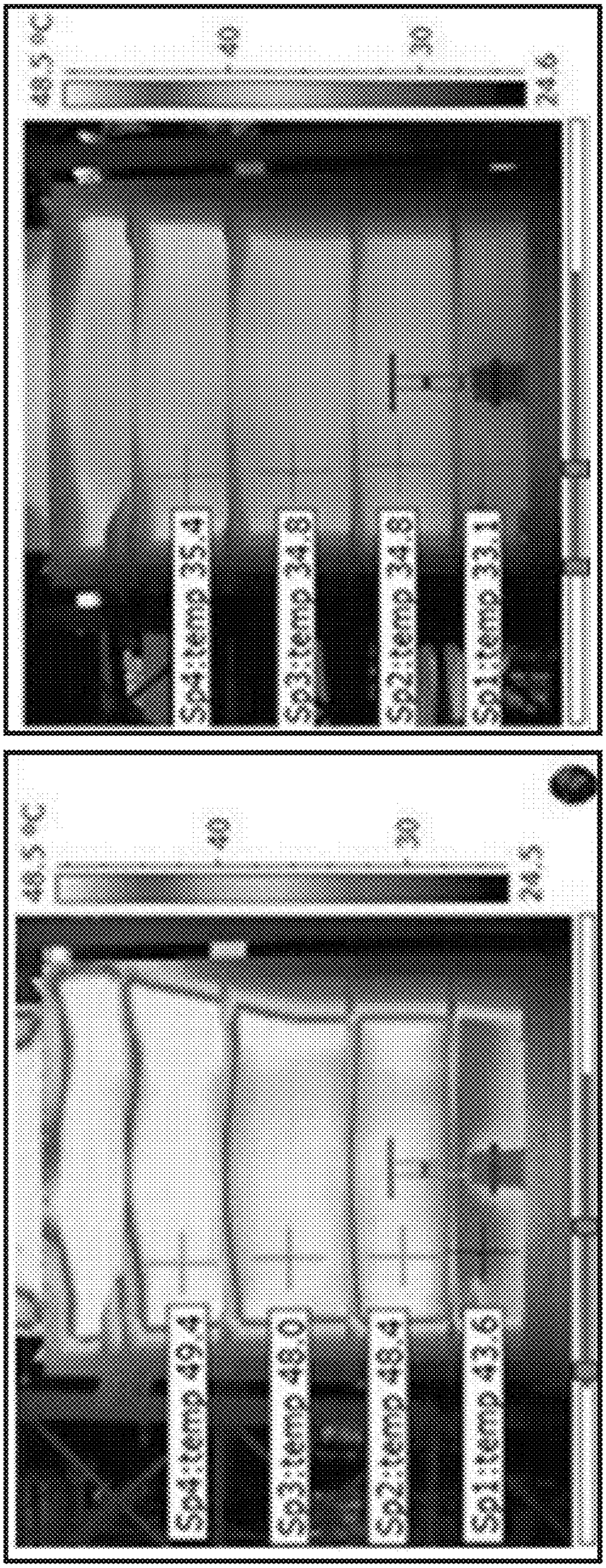
FIG. 15 shows a thermogram comparison of a vertical mill with blocked feeding (the thermogram on the left) and a vertical mill under normal operating conditions (the thermogram on the right).

The thermography technique described above can also allow for the identification of possible obstructions that occur in the feeding of vertical mills 10. When there is an obstruction in the feed, an accumulation of energy occurs due to the friction between the grinding bodies. The energy released is transferred in a form of heat conduction, generating an abnormal heating in the equipment housing. Obstruction in the feed will accelerate the wear of the helical coatings (i.e. wear plates 18, 20, 26), influence the operating performance and lead to additional energy waste. FIG. 15 shows a comparison of a vertical mill 10 with blocked feeding (the thermogram on the left) and a vertical mill 10 under normal operating conditions (the thermogram on the right).

Through examination it has been observed that the temperature of the housing 11 captured by the thermographic camera in normal conditions will not exceed 40° C. However, since the vertical mill illustrated on the left has a blockage/obstruction, the segment/portion of the housing 11 with the lowest temperature identified is higher than 40° C.

Figure 16:
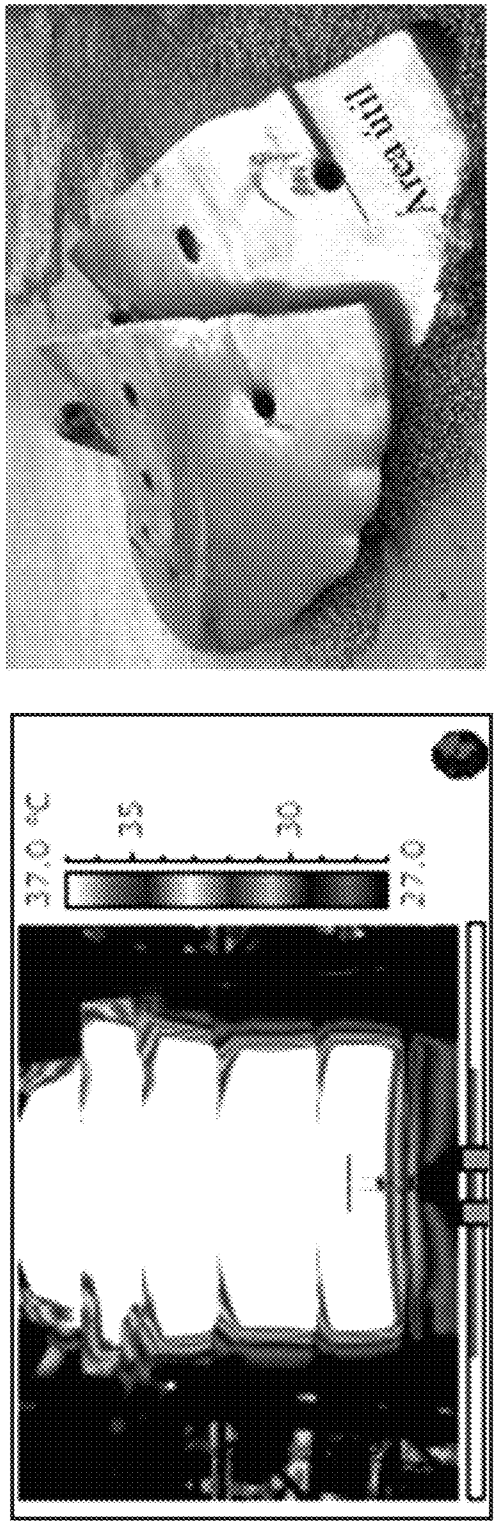
FIG. 16 shows a thermogram of a vertical mill and a photo of end wear plates thereof, where there was an obstruction and the vertical mill was opened prematurely with 3600 hours of operation.
Figure 17:
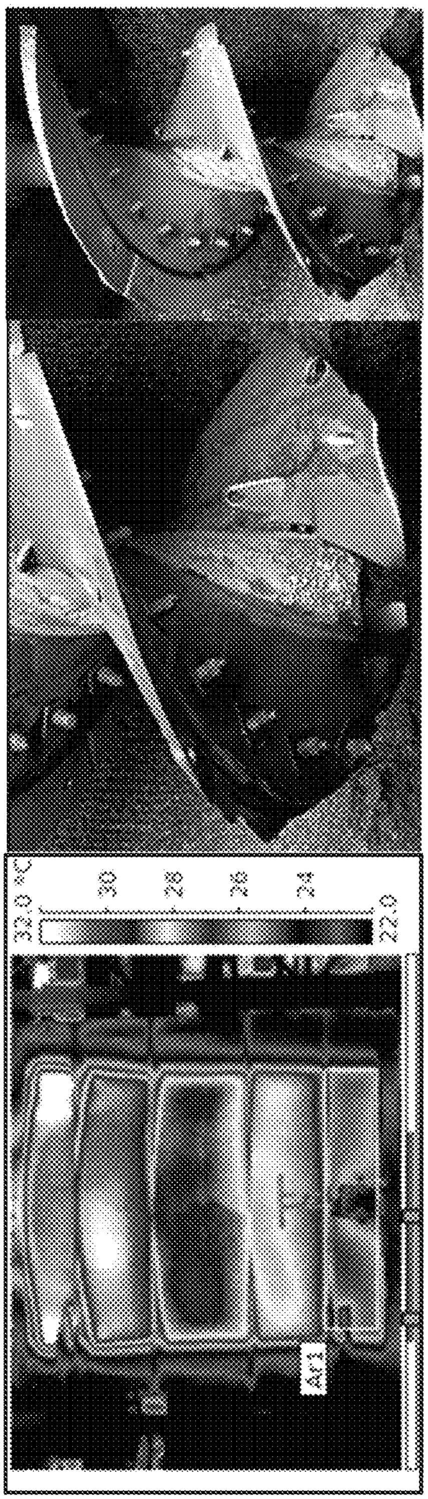
FIG. 17 shows a thermogram of a vertical mill and a photo of end wear plates thereof with 5280 hours of operation.

In practice, wear plates 18, 20, 26 used to be replaced with a maximum of about 4000 hours of operation. However, with the present system, the operating hours can be increased to about 5280 hours (i.e. 32% higher). In this regard, FIG. 16 shows (i) a thermogram of a vertical mill 10 and (ii) a photo of end wear plates 18, 20 of the vertical mill 10, where there was an obstruction in the supply pipe and the housing 11 was opened improperly with 3600 hours of operation. For comparison criteria, FIG. 17 shows (i) a thermogram of a vertical mill 10 and (ii) a photo of end wear plates 18, 20 of the vertical mill 10 with 5280 hours of operation.

Initial System Calibration

Figure 18:
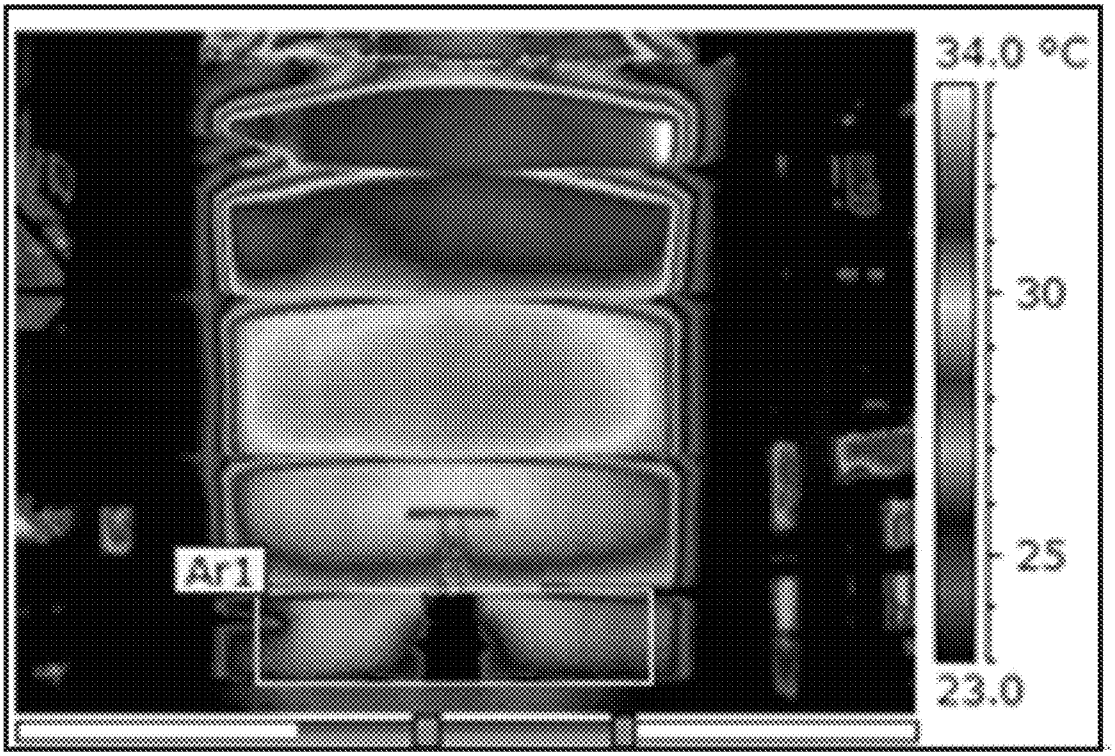
FIG. 18 shows a thermogram of a vertical mill and photos of some of the wear plates of the mill which were replaced immediately after the thermogram was generated.

Initially, in order to define an ideal period for intervention/replacement in the vertical mills 10, weekly measurements were needed to validate the thermogram and the coating characteristic after intervention (see FIG. 5). More specifically, weekly thermographic measurements of the mill were taken and recorded, in order to see how the thermal profile evolved over time. When the coatings/wear plates 18, 20, 26 were replaced, the real wear profile was analysed, in order to determine if the wear plates 18, 20, 26 actually reached their end of life. By using this analysis, as well as the latest/last thermogram performed on the vertical mill 10 (just before the physical inspection), the real end of life of the wear plates 18, 20, 26 were correlated with the last thermogram, in order to determine what an end-of-life thermogram looks like. Reference is in this regard specifically made to FIG. 5 which illustrates the evolution of the thermogram and its associated histogram over time. FIG. 18 shows an example of the most recent thermogram of a particular mill 10 and photos of some of the wear plates 18, 20, 26 which were replaced.

In one specific embodiment, thermal cameras 30 may be installed in order to provide thermal profiles (thermograms) for each of a number of vertical mills 10 in real-time. In addition to thermal cameras 30, vibration and temperature sensors can be installed in the grinding chambers 11 of vertical mills 10. In tests carried out, it has been identified that the evolution of the helical coatings wear (i.e. the wear plates 18, 20, 26) ends up influencing the level of vibration and temperature in the grinding chamber 11, since the increase in the dead load 25 attenuates the vibration and temperature, as already correlated in the thermal profile and, thus, the merger of these variables can enable the automation of the system/process, making the methodology a more robust database, a system completely online and with simultaneous responses with the area.

Figure 19:
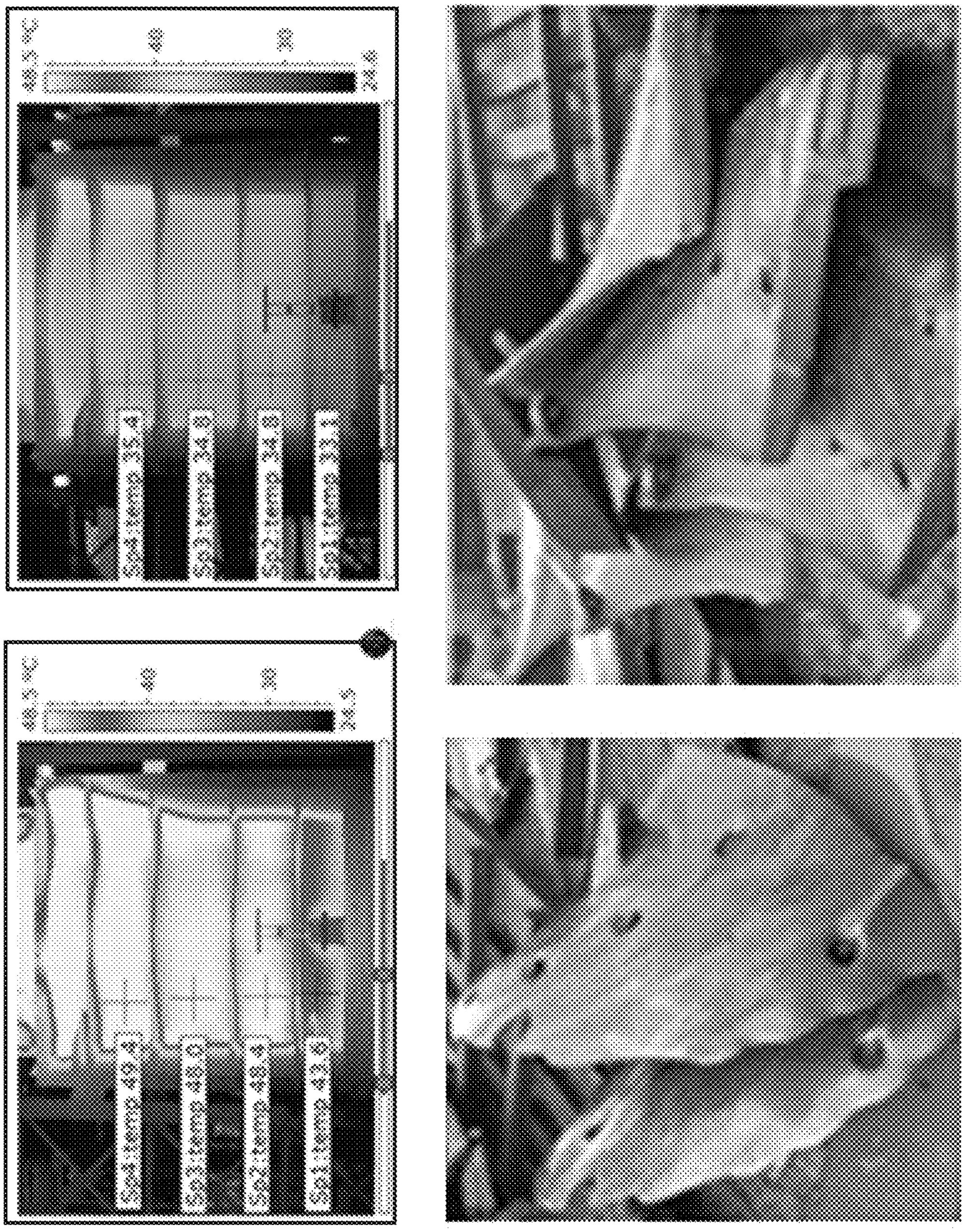
FIG. 19 shows a comparison between two thermograms of a vertical mill, wherein the thermogram on the left is of a vertical mill with an obstruction in the feeding, while the thermogram on the right is of a vertical mill operating under normal conditions.

The automation of the system/process then allows for real time identification in case of obstructions in the feed, which allows operatives to respond quickly to address the problem, thereby avoiding (i) unnecessary wear on the helical coatings (i.e. the wear plates 18, 20, 26), (ii) a negative impact on the quality of iron ore or other mineral being processed and energy consumption, and (iii) early/premature opening of the vertical mill 10. In this regard, reference is made to FIG. 19 which illustrates the difference between the histograms where there is an obstruction in the feeding of a vertical mill 10 (the histogram on the left), versus a vertical mill operating under normal conditions (the histogram on the right).

Figure 1:
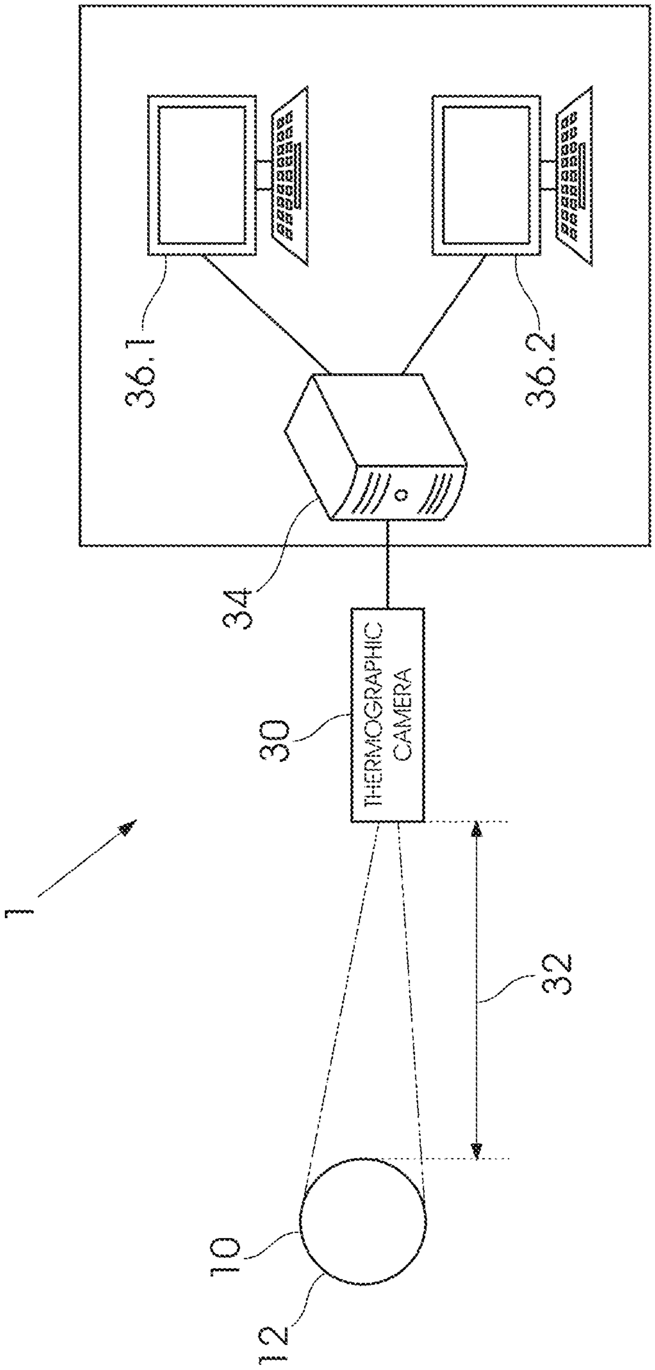
FIG. 1 shows a schematic layout of a system in accordance with the invention.
Figure 20:
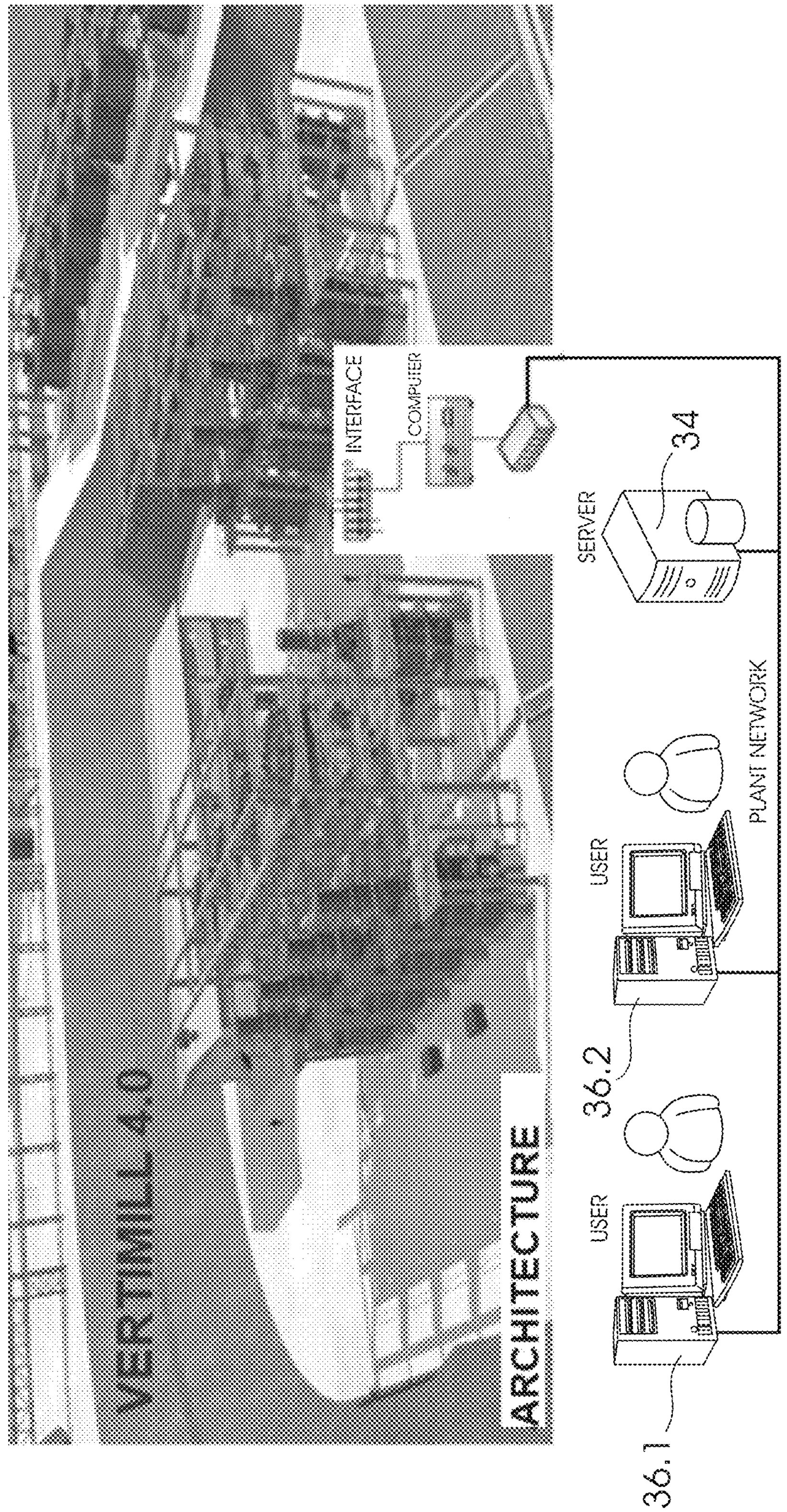
FIG. 20 shows another schematic layout of the system in accordance with the invention.

It should be noted that the thermographic camera 30, the one or more vertical mills 10, and the software described above, all forms part of a system 1 in accordance with the invention (see FIG. 1). The system 1, more specifically, also includes a server 34 which receives the thermographic images captured by the thermographic camera 30 and stores them on a database (not specifically shown). The images can then be utilised within the software platform described above in order to perform the necessary functions described earlier in real-time. The system therefore effectively includes a processing module (which is provided by the software platform) which is configured to perform the above-mentioned functions in real-time, as it received and then processes the thermal images. Users can typically use the software platform by utilising computing devices 36.1, 36.2 (e.g. computers or smart devices) in order to connect to the server 34 and obtain details of the captured thermographic images. Reference is in this regard also made to FIG. 20

Ball Mills

The operation of ball mills 50 are well known in the industry and typically includes a large grinding chamber/housing/cylinder 52 (e.g. about 26 feet (7.92 m) by 42 feet (12.8 m)) which rotates about an axis of rotation (more specifically, a horizontal axis of rotation), e.g. at a speed of about 11.6 rpm. In one example, the ball mill 50 can have a total of up to 288 wear components (there can however be less or more than 288) in the form of coating plates secured/mounted to an inner part of the cylinder and 120 wear components (also in the form of coating plates) located on a feeding cover 110 and discharge cover 120 of the ball mill 50. These coating plates (also referred to as "coatings") are again the main cost of maintenance and impacts both physical availability and security. For any activity of inspection or replacement of the coating plates, a technician has to enter inside the grinding chamber 52, which is classified as a "confined space", and which can be a dangerous exercise for the technicians.

Figure 21:
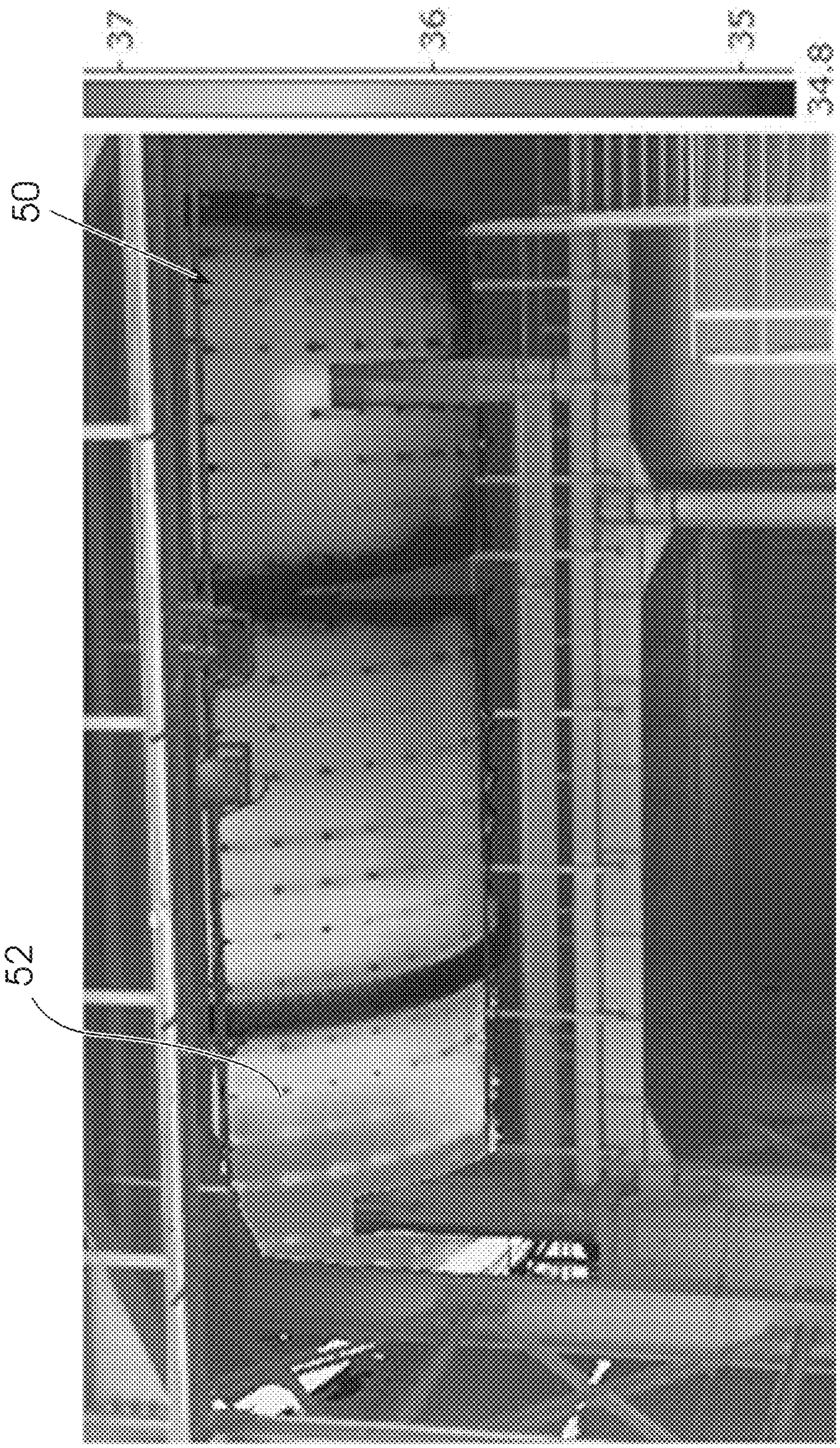
FIG. 21 shows a thermogram of a housing/cylinder of a ball mill.

The application of thermography in ball mills 50 consists of identifying the coating plates with accentuated wear and programming the replacement of these coating plates at programed stops. It also provides for the identification of broken wear plates/linings/coatings (hereinafter only referred to as "wear plates") and thus avoid accentuated wear on the grinding chamber 52. In order to capture the thermal images of the ball mills 50, a thermal camera 30 is again positioned at a distance away from the grinding chamber 52 and directed towards the grinding chamber 52. In this regard, reference is made to FIG. 21 which shows an example of a thermographic image captured of the grinding chamber 52 of a ball mill 50, by a thermal camera 30.

In order to carry out the inspection, a thermographic baseline in respect of all the wear plates (i.e. 100% of the wear plates), when the wear plates are new, is important. This thermal profile can then be used during the operation of the ball mill 50, serving as a reference to identify future breaks or accentuated wear.

Figure 22:
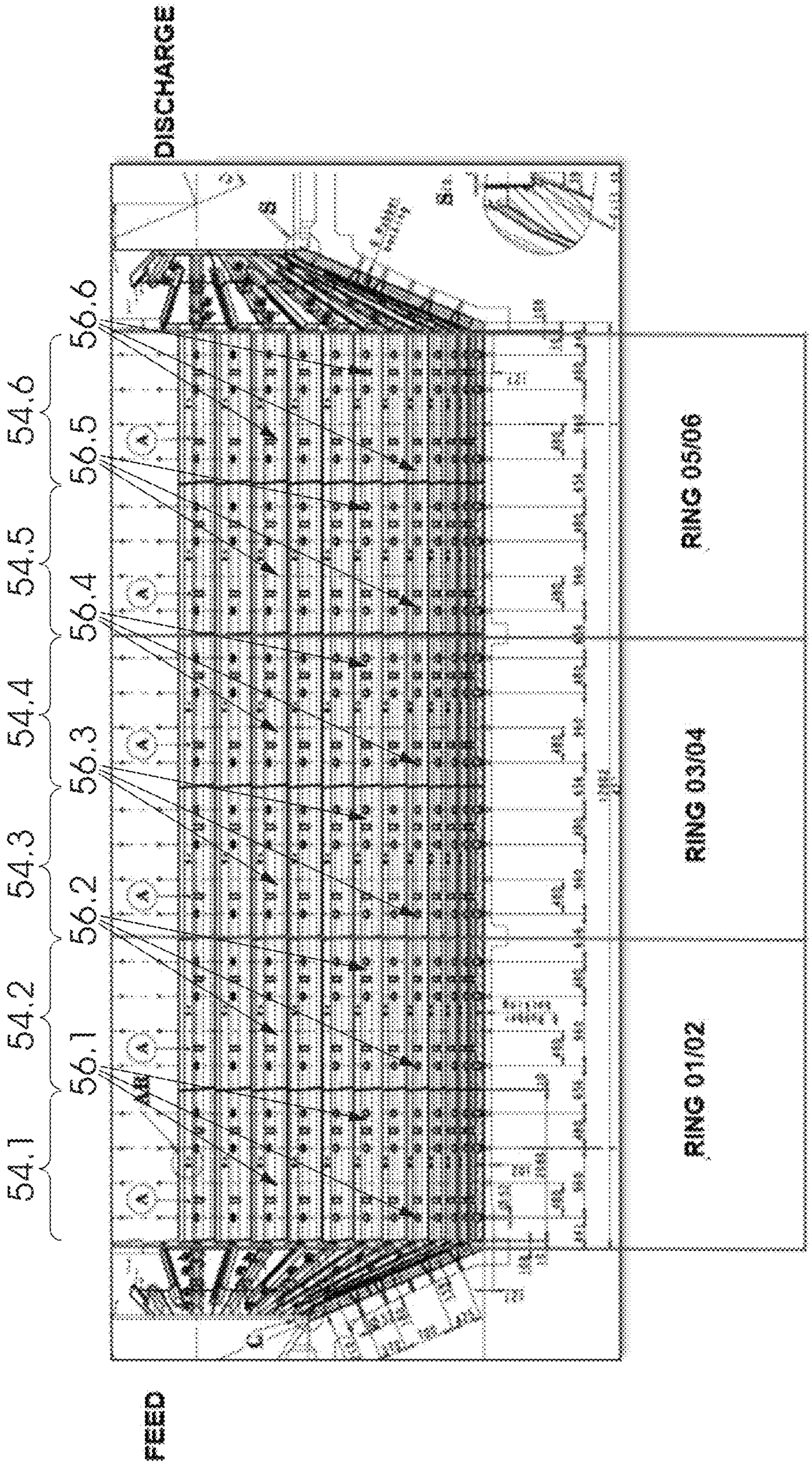
FIG. 22 shows a schematic layout of a housing/cylinder of a ball mill.

As shown in FIG. 22, it is important to create a map with the distribution of the wear plates. The wear plates are generally divided into 6 rings (generally indicated by reference numerals 54.1-54.6, respectively). Each ring 54.1-54.6 has 48 wear plates (generally indicated by reference numerals 56.1-56.6) which are distributed/spaced along a radially inner surface of the housing 52. Each wear plate 56.1-56.6 is subdivided into 4 parts totaling a percentage of 25% each, so it is possible to identify the extent of wear for each wear plate 56.1-56.6.

Figure 23:
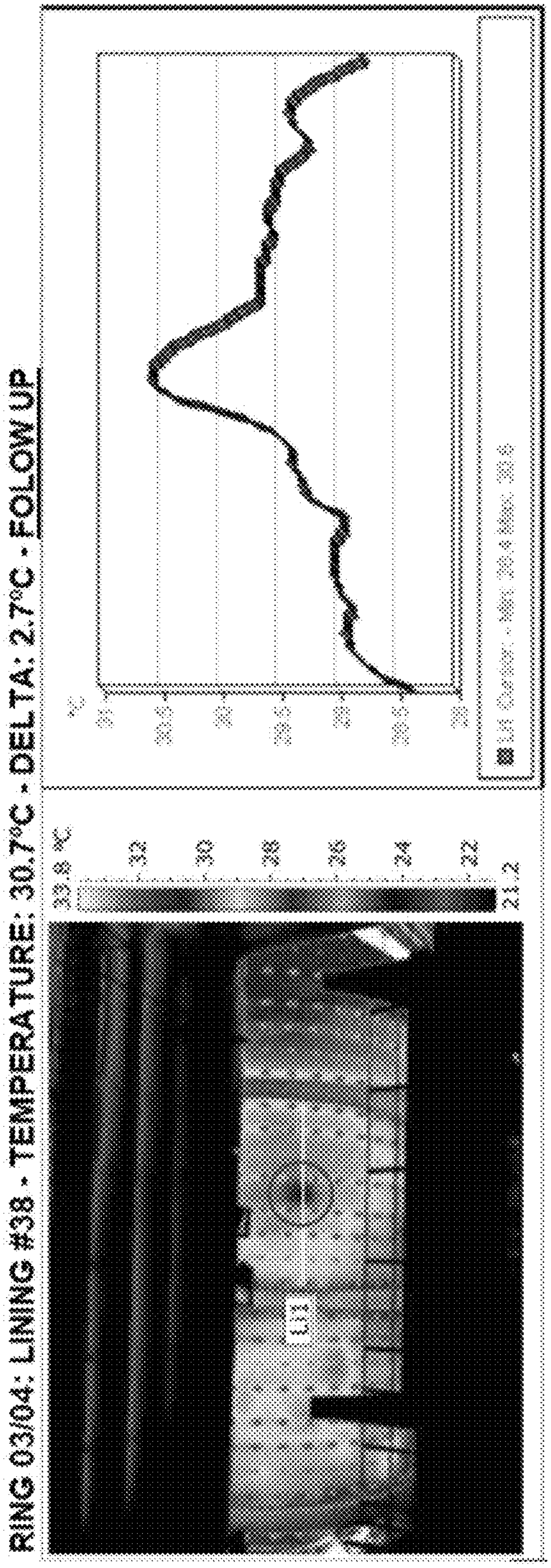
FIG. 23 shows a thermogram of a housing/cylinder of a ball mill and an associated graph which illustrates the temperature variation along a line labelled "Li1"

In one specific practical experiment, illustrated in FIG. 23, it was possible to observe an abnormal variation in the coating between ring 03 and 04 (see the area indicated by reference numeral 56), with a thermal variation of 2.7° C. The thermogram, as well as the specific location of the abnormal variation on the map of the wear plates, were saved in order to help keep track.

The location of the abnormal thermal variation and its distribution were compared with fixing screws (see reference numeral 60 in FIG. 24) which secured/fixed the wear plates to the grinding chamber 52, in order to determine whether the abnormality was in respect of all the coating plates or a specific percentage of a particular coating plate (e.g. 25%, 50% or 75%).

Figure 24:
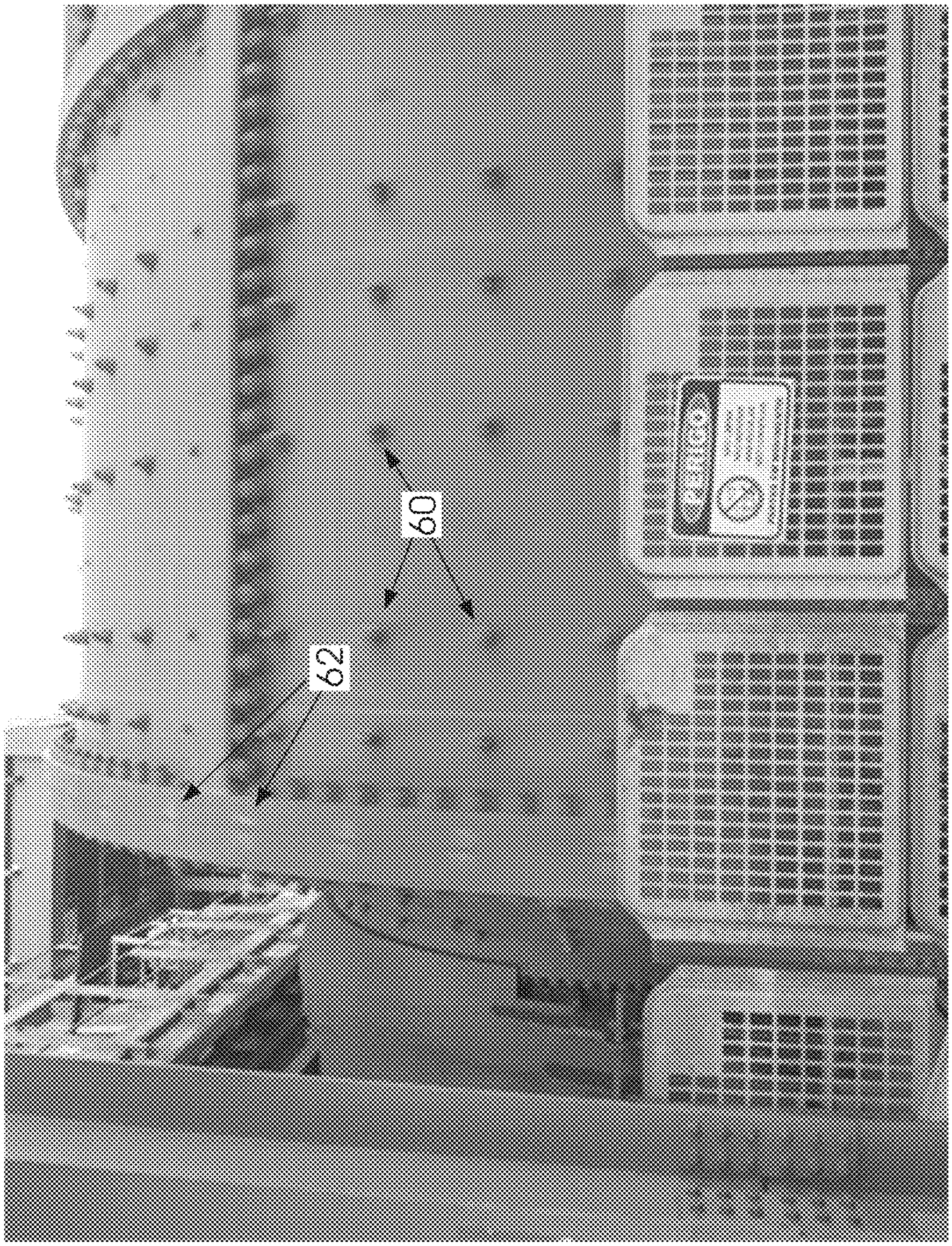
FIG. 24 shows a photo of a housing/cylinder of a ball mill, taken from the outside.

To support the identification of the specific wear plate, the location of the wear plates were marked on a radially outer side of the housing, as shown in FIG. 24 (see reference numeral 62). This marking helped to allow a technician to identify the exact location of the abnormality(ies).

Figure 25:
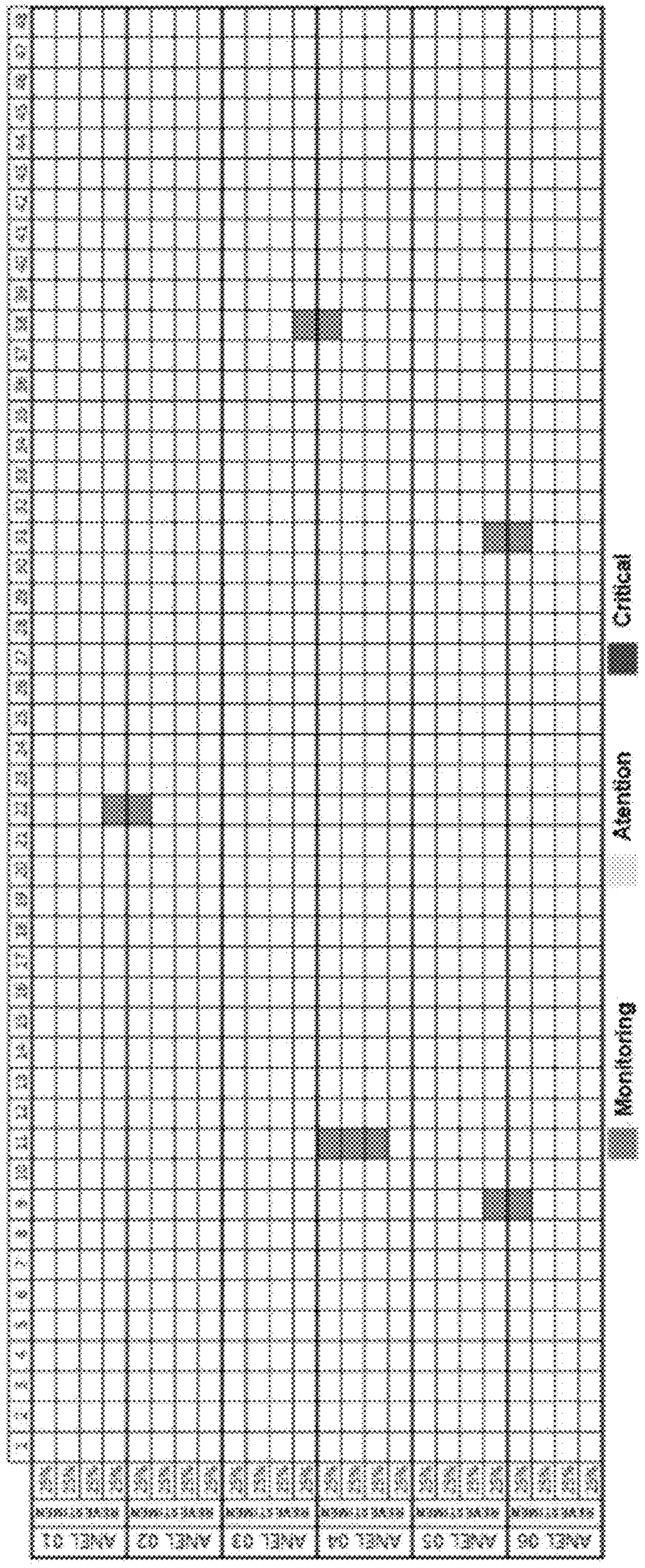
FIG. 25 shows a grid of the thermal layout/distribution of all the wear plates of a particular ball mill.

FIG. 25 shows a grid of the thermal layout/distribution of all the wear plates of a particular ball mill 50. This grid can be generated within the software platform described earlier. In the drawing, numbers 1-48 refer to the 48 wear plates of each ring, while ANEL01-ANEL06 refer to the 6 rings, respectively. Each ring is also divided into 4 parts (25% each) as mentioned earlier.

For alarm/alert criteria, a temperature delta/difference over the cylinder/housing 52 was checked, with a variation of 4 degrees Celsius and more considered characteristic of a breaking or detachment of the wear plate and a temperature delta/difference greater than 2 degrees Celsius were defined as "to be monitored" (i.e. a potential issue to be monitored). In other words, a variation in temperature of more than a pre-determined amount may be seen as a potential issue.

Figure 26:
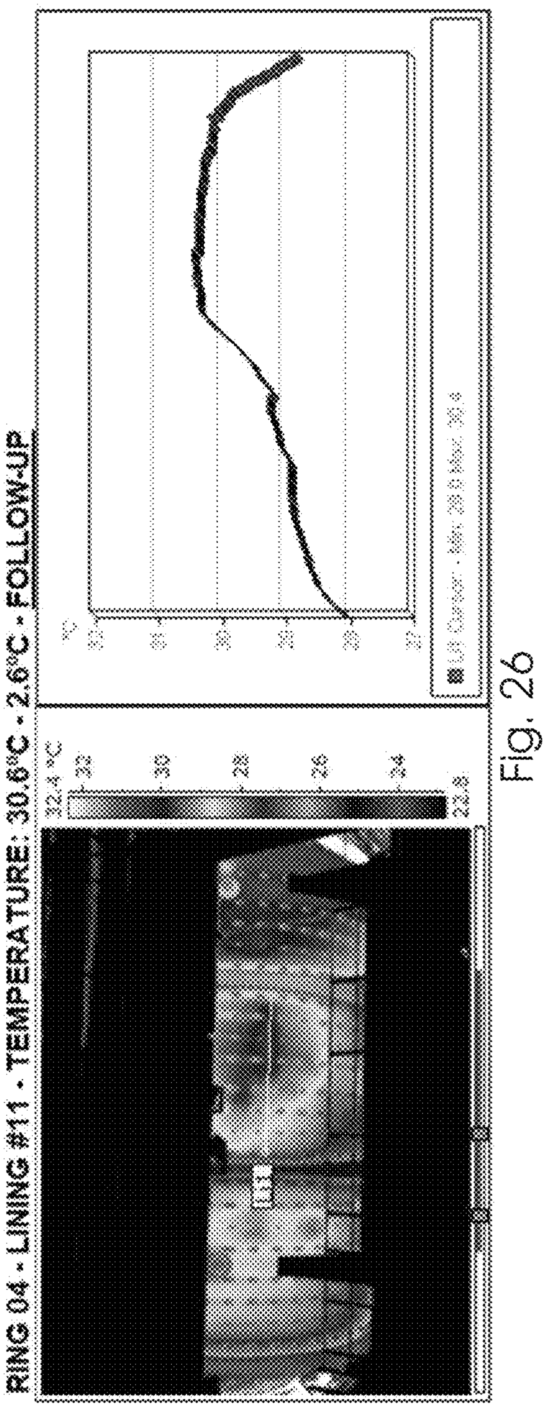
FIG. 26 shows a thermogram of a housing/cylinder of a ball mill and an associated graph which illustrates the temperature variation along a line labelled "Li1"
Figure 27:
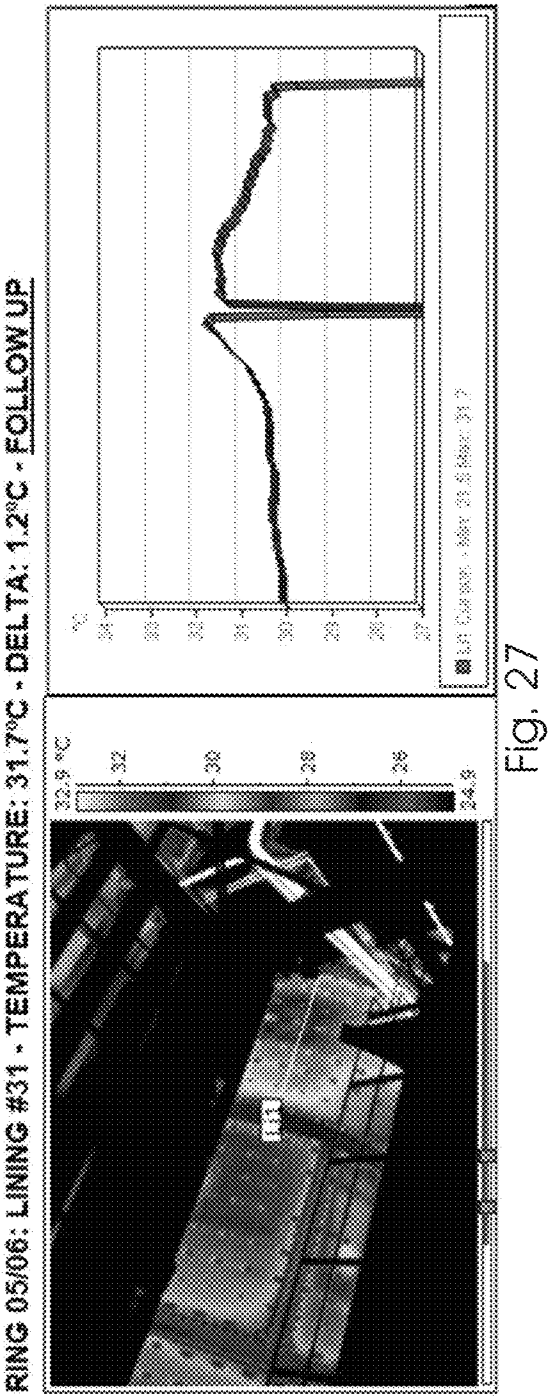
FIG. 27 shows a thermogram of a housing/cylinder of another ball mill and an associated graph which illustrates the temperature variation along a line labelled "Li1"

In FIGS. 25 and 26, reference is specifically made to the thermal variation that rings 01-04 have, when compared to rings 05/06. The variation observed in ring 04 (see FIG. 26), is from 22.8° C. to 32.4° C., while the variation in rings 05/06 is from 24.90 to 32.9° C.

Figure 29:
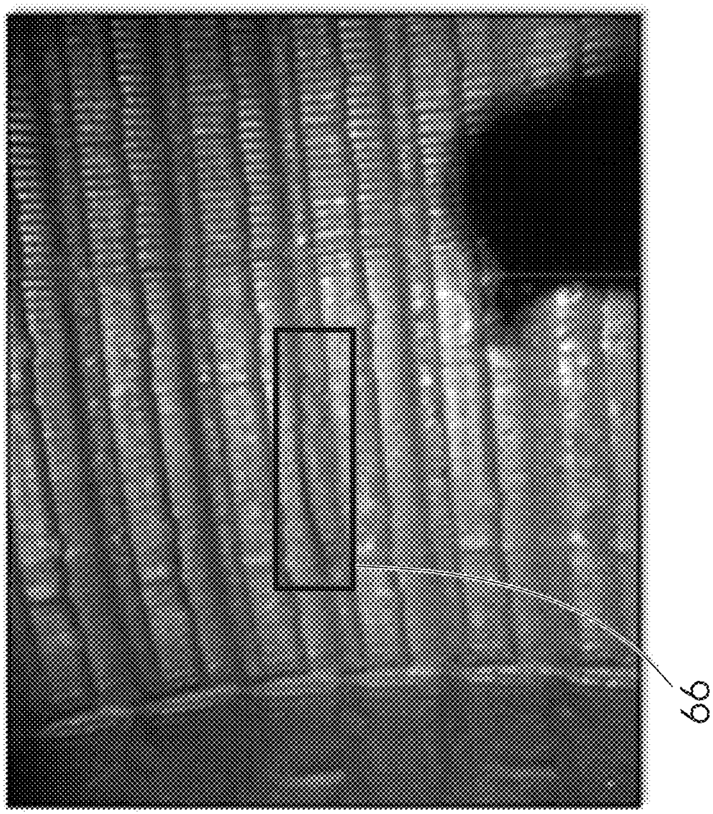
FIG. 29 shows a photo of the part illustrated in FIG. 28, showing the possible breakage.
Figure 28:
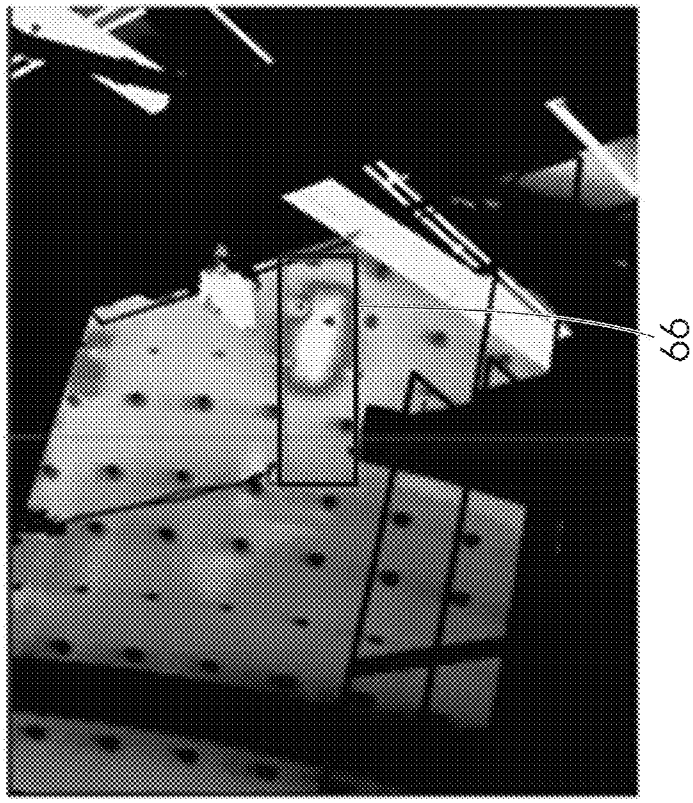
FIG. 28 shows a thermogram of part of a housing/cylinder of a ball mill, where there is a possible breakage of a wear plate(s)
Figure 30A:
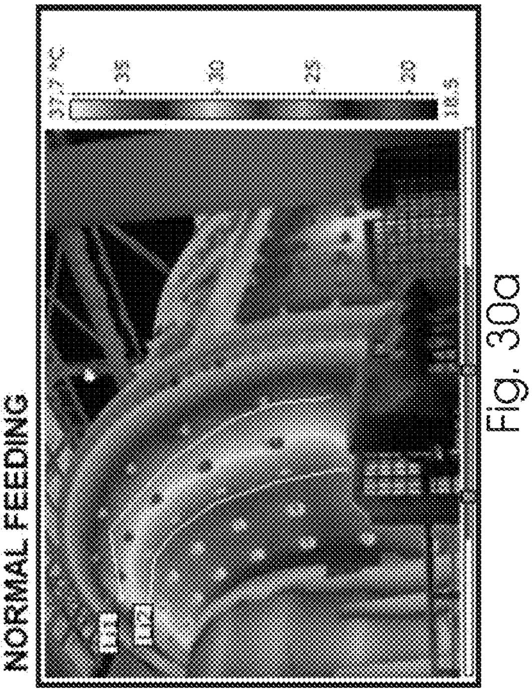
FIG. 30*a* shows a thermogram of a supply cover of a ball mill.
Figure 30B:
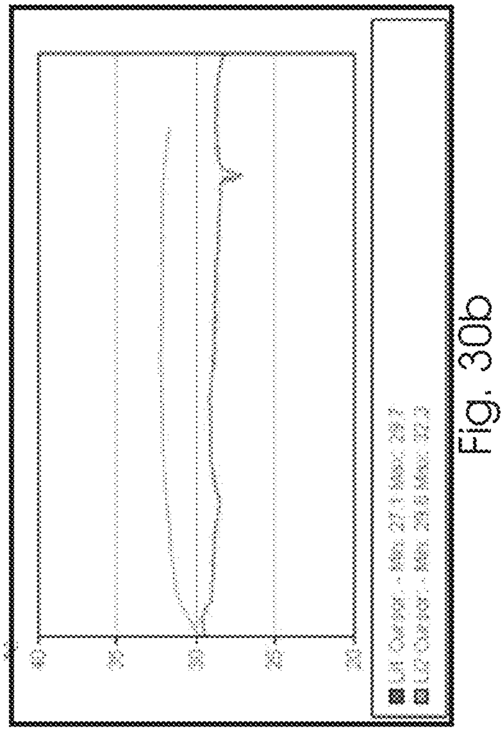
FIG. 30*b* shows a graph which illustrates the temperature variation along the lines labelled "Li1" and "Li2" shown in FIG. 30*a;*
Figure 30C:
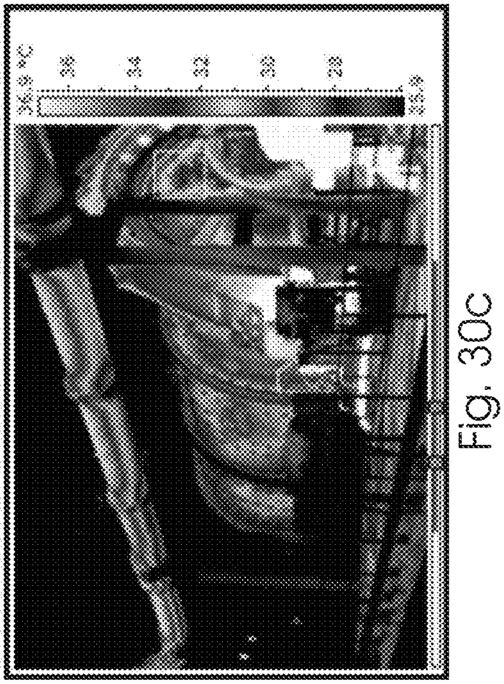
FIG. 30*c* shows a thermogram of a discharge cover of a ball mill.
Figure 30D:
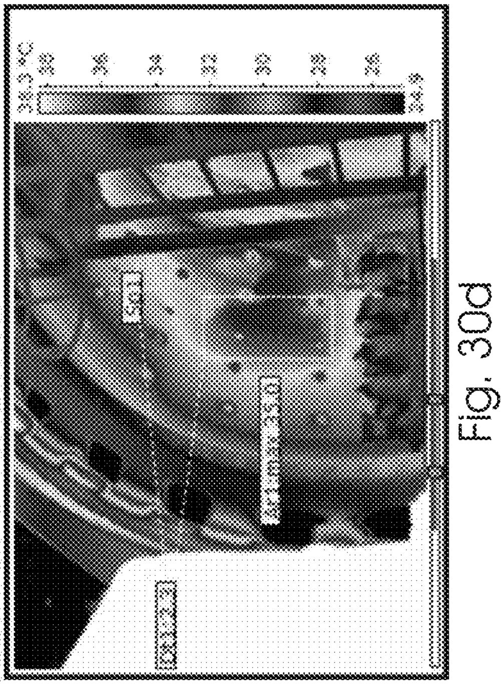
FIG. 30*d* shows a thermogram of part of a discharge cover of a ball mill, where there is a possible breakage of a wear plate(s)
Figure 31:
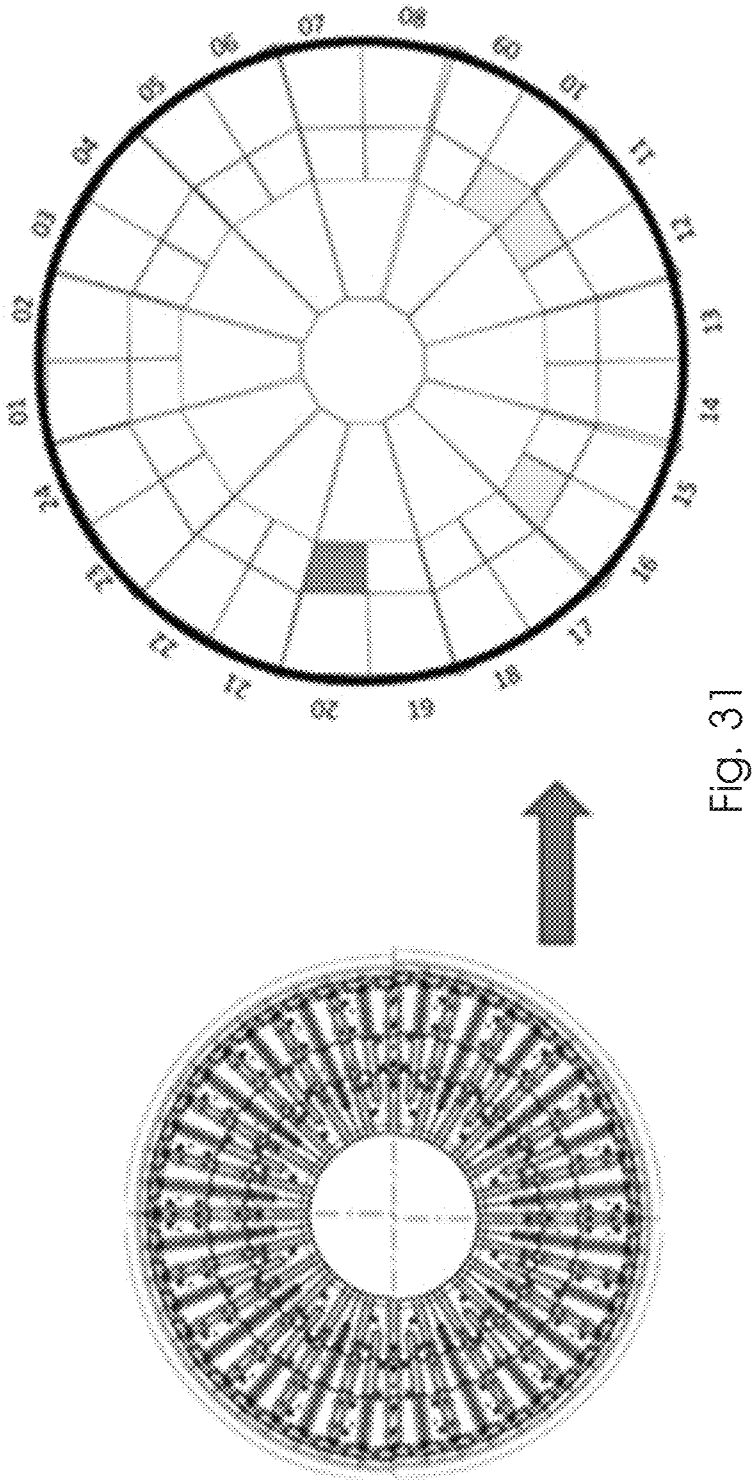
FIG. 31 shows a schematic layout and a grid of the thermal layout/distribution of all the wear plates of a supply cover of a ball mill.

In an example illustrated in FIGS. 28 and 29, a breakage of a wear plate/coating is identified through thermography (see reference numeral 66), thereby preventing damage to the housing 52 and thus ensuring greater reliability for inspection.

The same methodology can also be applied to the supply cover 110 and discharge cover 120 of the ball mill 50. Reference is in this regard made to FIGS. 30*a-d* and 31.

The system, as applied to a ball mill 50, therefore allows all the wear plates/coatings to be effectively monitored in real-time, without impacting on the operation of the ball mill 50. Another benefit is the non-exposure of the technicians to the risk of the confined space inside the housing 52.

Although the description focused specifically on vertical mills and ball mills, it should be appreciated that the same methodology and system can be implemented on other types of grinding mills.

By utilising thermography within vertical mills in the manner as described above, it leads to several advantages. The system 1 and methodology applied can help provide a reduction of up to approximately 20% in annual coatings changes, going from 35 openings per year to about 28. This increases the productivity of these mills and helps to reduce the risk of technicians entering the mills unnecessarily (e.g. when the wear plates are actually still in relative good condition). More specifically, the system and methodology allows for a significant reduction of exposure to risk in a confined space (i.e. within the housings of the mills) where material can fall on technicians. By constantly monitoring the housings and wear plates therein, in real-time, the wear plates can be used more efficiently (i.e. for longer periods) and possible issues can be identified relatively quickly. The same also applies to possible blockages.

Our technology is focused on analyse the temperature range, correlate it with the ambient temperature and estimate the level of wear (not only whether there is wear or not).

The invention claimed is:

1. A method of predicting a level of wear of a wear component of a vertical mill, whereby the vertical mill is used for grinding feed material, wherein the vertical mill includes a grinding chamber inside which feed material is contained and grinded during operation, wherein the method includes, while the mill is in operation:

capturing/obtaining a thermal profile of the mill from outside the grinding chamber of the mill, while feed material is contained inside the grinding chamber; and determining an indication as to a level of wear of at least one wear component of the mill which is located inside the grinding chamber, based on the thermal profile of the mill.

2. The method of claim 1, wherein the step of capturing/obtaining a thermal profile includes performing a thermographic analysis of the mill from outside the grinding chamber of the mill.

3. The method of claim 2, wherein the determining step includes determining whether the wear component requires changing/replacement based on the thermographic analysis of the mill.

4. The method of claim 2, which includes capturing one or more thermal images of the grinding chamber by using a thermal image capturing device which is located outside the grinding chamber and which is directed towards the grinding chamber, and wherein the method includes using the one or more thermal images within the thermographic analysis.

5. The method of claim 4, wherein the at least one wear component is a wear liner or wear coating of the mill.

6. The method of claim 5, wherein the at least one wear component is a coating plate.

7. The method of claim 4, wherein the mill includes a rotating screw to which at least one wear liner is secured, wherein the at least one wear liner is the said at least one wear component.

8. The method of claim 7, wherein the determining step includes identifying whether a dead zone of sedimented material has formed at an operatively lower part/end of the grinding chamber, by using the thermographic analysis.

9. The method of claim 8, which includes:

measuring an ambient temperature and using it as a reference temperature within the thermographic analysis;

obtaining, by using a processor, a thermal distribution of the grinding chamber captured within the thermal image(s) thereof, and comparing the thermal distribution with the reference temperature.

10. The method of claim 9, wherein the step of obtaining a thermal distribution of the grinding chamber more specifically includes obtaining a thermal distribution of an operatively lower portion/bottom portion of the grinding chamber, and wherein the method includes:

generating, by using a processor, a histogram of the thermal distribution of the portion and comparing it with the reference temperature;

identifying a temperature within the histogram with the greatest influence/highest occurrence; and estimating when the at least one wear component requires replacement, by utilising the said comparison.

11. A method of operating a vertical mill which is used for grinding feed material, wherein the method includes:

while the mill is in operation, capturing/obtaining a thermal profile of the mill from outside a grinding chamber of the mill, wherein the grinding chamber contains feed material during operation which is grinded within the grinding chamber; and while the mill is in operation, determining an indication as to a level of wear of a wear component of the mill which is located inside the grinding chamber based on the thermal profile of the mill.

12. The method of claim 11, wherein the step of capturing/obtaining a thermal profile includes performing a thermographic analysis of the mill from outside the grinding chamber of the mill.

13. The method of claim 12, wherein the determining step includes determining whether the wear component requires changing/replacement based on the thermographic analysis of the mill.

14. The method of claim 13, which includes capturing one or more thermal images of the mill by using a thermal image capturing device which is located outside the grinding chamber and which is directed towards the grinding chamber, and wherein the method includes using the one or more thermal images within the thermographic analysis.

15. The method of claim 13, wherein the at least one wear component is a wear liner or wear coating of the mill.

16. The method of claim 11, which includes identifying a possible blockage inside the grinding chamber, by utilising the temperature profile.

17. A system for grinding feed material, wherein the system includes:

a vertical mill which is used for grinding feed material, and wherein the vertical mill includes a grinding chamber inside which feed material is contained during operation for grinding the feed material, and one or more wear components which is/are located inside the grinding chamber;

a temperature capturing device/arrangement which is located outside the grinding chamber and directed towards the grinding chamber, wherein the temperature capturing device/arrangement is configured to capture one or more temperature indications/readings of at least part of the grinding chamber during operation; and a processing module which is configured to obtain a thermal profile of the grinding chamber in real-time while the mill is in operation, by using the captured temperature indications/readings, and determine, in real-time, an indication as to a level of wear of the one or more wear components inside the grinding chamber, based on the thermal profile.

18. The system of claim 17, which includes:

a plurality of wear components which are located inside the grinding chamber, and grinding bodies which are located inside the grinding chamber for grinding the feed material during operation.

19. The system of claim 18, wherein the mill includes a rotating screw which is located inside the grinding chamber;

at least some of the plurality of wear components are secured to the screw; and the processing module is configured to predict/identify whether a dead zone of sedimented material has formed inside the grinding chamber, at an operatively lower part/end of the grinding chamber, by using the thermal profile.

20. The system of claim 17, wherein the temperature capturing device/arrangement is a thermal image capturing device, wherein the thermal image capturing device is configured to capture one or more thermal images of at least part of the grinding chamber during operation, and wherein the processing module is configured to perform a thermographic analysis of the grinding chamber in real-time while the mill is in operation, by using the captured one or more thermal images, and determine, in real-time, an indication as to a level of wear of the one or more wear components inside the grinding chamber, based on the thermographic analysis.

* * * * *